(12) United States Patent
Radin

(10) Patent No.: US 6,867,693 B1
(45) Date of Patent: Mar. 15, 2005

(54) SPATIAL POSITION DETERMINATION SYSTEM

(76) Inventor: Lon B. Radin, 2390 Hanover St., Palo Alto, CA (US) 94306

( * ) Notice: Subject to any disclaimer, the term of this patent is extended or adjusted under 35 U.S.C. 154(b) by 784 days.

(21) Appl. No.: 09/915,662

(22) Filed: Jul. 25, 2001

(51) Int. Cl.[7] .............................................. G08B 1/08

(52) U.S. Cl. .............................. 340/539.13; 340/539.1; 340/539.11; 340/539.23

(58) Field of Search .......................... 340/539.1, 539.11, 340/539.13, 539.21, 539.23, 573.1

(56) References Cited

U.S. PATENT DOCUMENTS

| | | | |
|---|---|---|---|
| 3,677,646 A | | 7/1972 | Granqvist ........................ 356/4 |
| 3,683,279 A | * | 8/1972 | Weinberg et al. ........... 455/13.2 |
| 4,451,930 A | | 5/1984 | Chapman et al. ............ 455/206 |
| 4,799,062 A | | 1/1989 | Sanderford et al. .......... 342/450 |
| 5,109,532 A | | 4/1992 | Petrovic et al. ................ 455/63 |
| 5,125,008 A | | 6/1992 | Trawick et al. .............. 375/102 |
| 5,181,181 A | * | 1/1993 | Glynn ......................... 702/141 |
| 5,280,295 A | | 1/1994 | Kelley et al. ................ 342/463 |
| 5,321,726 A | | 6/1994 | Kafadar ........................ 375/79 |
| 5,430,537 A | | 7/1995 | Liessner et al. .............. 356/5.1 |
| 5,483,158 A | | 1/1996 | van Heteren et al. ........ 324/318 |
| 5,559,518 A | | 9/1996 | DiDomizio .................. 342/174 |
| 5,603,094 A | | 2/1997 | Greear, Jr. ..................... 455/66 |
| 5,722,064 A | | 2/1998 | Campana, Jr. ............... 455/351 |
| 5,818,383 A | | 10/1998 | Stockburger et al. ........ 342/109 |
| 5,900,818 A | | 5/1999 | Lemnell .................... 340/573.3 |
| 5,999,493 A | | 12/1999 | Olson ........................... 368/47 |
| 6,067,018 A | | 5/2000 | Skelton et al. ............ 340/573.3 |
| 6,075,442 A | | 6/2000 | Welch ...................... 340/573.1 |
| 6,292,062 B1 | | 9/2001 | Bourk et al. ................... 331/46 |
| 6,453,168 B1 | | 9/2002 | McCrady et al. ............ 455/517 |
| 6,507,749 B1 | * | 1/2003 | Macgowan et al. .......... 600/419 |

OTHER PUBLICATIONS

Quartzlock, "Model 8 Series, GPS Receivers and GPS Disciplined Oscillators User's Handbook," printed Mar. 7, 2001 from www.quartzlock.com?cgi–bin/serve.cgi?page= download_MNQL–A8.pdf.

R. S. Trenam, "Automatic Animal Tracking on a Limited Budget," in *The Collection and Processing of Field Data*, 1996, pp. 273–281.

Mar. 7, 2001 printout from www.eecis.udel.edu/~mills/database/reports/loran/loranb.pdf.

F. C. Huang, et al, "Multiple–Frequency Continuous Wave Ultrasonic System for Accurate Distance Measurement," in *Review of Scientific Instruments*, Feb. 1999, vol. 70, No. 2, pp. 1452–1458.

(List continued on next page.)

*Primary Examiner*—Daryl C. Pope
(74) *Attorney, Agent, or Firm*—Edwin A. Suominen; Louis J. Hoffman

(57) ABSTRACT

A system is disclosed that determines a spatial position of a tracker device relative to an object sending a return signal to the tracker. Such a system advantageously maintains phase accuracy between a forward signal from the tracker device and the return signal generator from the object. The system can include, as part of a tracker device, a reference signal generator, a transmitter, a receiver, and a spatial position computer. The reference signal generator is responsive to and phase-stabilized by a broadcast signal, e.g., a signal received from a commercial AM broadcast transmitter. The transmitter and receiver are both coupled to and phase-stabilized by the tracker reference signal generator. Variations and methods with different advantageous features are also described.

32 Claims, 13 Drawing Sheets

OTHER PUBLICATIONS

C. C. Counselman, and Gourevitch, S. A. Sergei, "Miniature Interferometer Terminals for Earth Surveying: Ambiguity and Multipath with Global Positioning System," in *Proc. IEEE Transactions on Geoscience and Remote Sensing*, Oct. 1981, vol. GE–19, No. 4, pp. 244–252.

T. J. Warnagiris, "Legal Unlicensed Transmitting," in *Applied Microwave & Wireless*, Spring 1996, pp. 32–54.

C. N. Dorny, "Least–Square Solution of Redundant Nonlinear Equations for Self–Cohering of Antenna Systems," *Moore School of Electrical Engineering*, pp. 397–402 (undated copy).

J. W. Pierre, et al., "Effects of Quadrature Receiver Gain Error on Direction–Finding Algorithms," in *Proc. IEEE Pac. Rim*, May 1993, pp. 378–381.

* cited by examiner

SPATIAL POSITION DETERMINATION SYSTEM

BACKGROUND OF THE INVENTION

The problem of determining the spatial position of objects is an ancient one. Perhaps the simplest and oldest known solution is to pace off a distance to a visible object by walking toward it along a straight path. More accurate and recent techniques include triangulating the location of a hidden object based on estimated distances or azimuthal angles to the object.

Measurement of azimuthal angle to a given object tends to be less accurate than measurement of distance to that object. Extremely precise instruments have been developed for distance measurement. For example, an optical instrument disclosed in U.S. Pat. No. 5,430,537 to Liessner et al. purports to have accuracy around the 1–10 micron resolution of light wavelengths. This instrument is based on phase changes between a light beam sent to a passive reflector and another light beam returned from the reflector.

Less precise instruments for phase-based distance measurement can provide benefits in particular applications. For example, R. S. Trenam, "Automatic Animal Tracking on a Limited Budget," in The Collection and Processing of Field Data (1967) (pp. 273–82), discloses tracking of sheep to 20-yard accuracy using RF phase measurements.

In any system relying on phase differences between forward and return signals, frequency stability of the signals is critical to maintaining accuracy of distance measurement. Slight frequency deviations in the forward and return signals can cause significant phase deviations, especially when the distance to be measured includes a large number of wavelengths. Such phase deviations interfere with those expected from changes in distance and can significantly degrade accuracy.

SUMMARY OF THE INVENTION

A spatial position determination system according to various aspects of the present invention determines a spatial position of a tracker device relative to an object sending a return signal to the tracker. Such a system advantageously maintains phase accuracy between a forward signal from the tracker device and the return signal from the object.

A system according to particularly advantageous aspects of the invention includes, as part of a tracker device, a reference signal generator, a transmitter, a receiver, and a spatial position computer. The reference signal generator is responsive to and phase-stabilized by a broadcasted signal, e.g., a signal received from a commercial AM broadcast transmitter. The transmitter and receiver are both coupled to and phase-stabilized by the tracker reference signal generator. The spatial position computer is coupled to the receiver and (1) the tracker reference signal generator or (2) the tracker transmitter, or (3) both. The spatial position computer is responsive to indicia of a phase relationship between an output signal from the tracker transmitter and an input signal to the tracker receiver. Based on that indicia, the spatial position computer determines the spatial position of the tracker relative to the input signal source.

A spatial position can be expressed in a number of ways. It can be expressed as a stationary position, i.e., a point in space. Alternatively, it can be expressed as a differential position, e.g., a velocity or an offset from a previous spatial position. In addition, a spatial position can be expressed as a physical measure of distance, or as a proportion of a wavelength of the input signal.

A spatial position determination system according to particular aspects of the invention advantageously includes a transponder coupled via field radiation to the tracker and triggered by it to produce a return signal. The transponder includes a transmitter and a receiver, which are coupled via field radiation to the tracker receiver and transmitter, respectively. A tracker's spatial position computer in such a system is responsive to indicia of a phase relationship between an output signal from the tracker transmitter and an input signal received from the transponder transmitter. Based on that indicia, the spatial position computer determines the spatial position of the tracker relative to the transponder.

A transponder in a system according to further aspects of the invention includes its own reference signal generator, which is responsive to and phase-stabilized by a broadcasted signal. The receiver and transmitter in such a transponder are coupled to and phase-stabilized by the transponder reference signal generator. In such a system, the tracker reference signal generator and the transponder reference signal generator can both be responsive to the same broadcasted signal.

Phase-stabilized and phase-stabilizing signal generators according to further aspects of the invention include a stabilizing DDS (direct digital synthesis) module having a phase accumulator that is clocked responsive to sync pulses, and an output DDS module. The output DDS module is coupled to the stabilizing DDS module and has a phase accumulator that is clocked by system clock pulses but forced to the accumulated phase of the first DDS module upon occurrence of a qualified sync pulse.

The above summary does not include an exhaustive list of all aspects of the present invention. Indeed, the inventor contemplates that his invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

Various embodiments of the present invention are described below with reference to the drawings, wherein like designations denote like elements.

DESCRIPTION OF PREFERRED EXEMPLARY EMBODIMENTS

Figure 1:
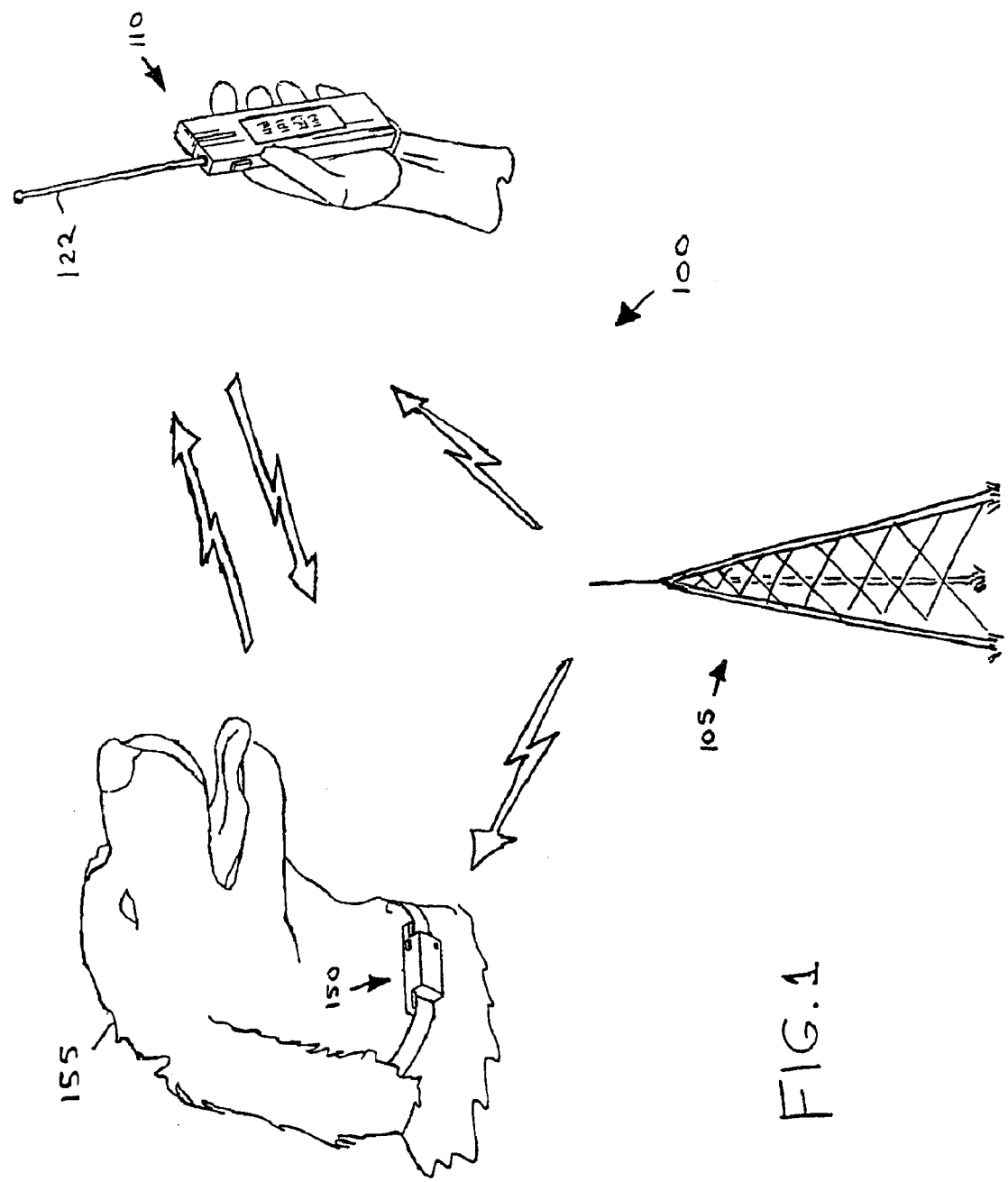
FIG. 1 is a simplified perspective view of a tracker device and a transponder device in a phase-referencing pet location system according to various aspects of the invention.

A spatial position determination system according to various aspects of the present invention provides numerous benefits, including permitting highly accurate phase-based determination of distance without the need to include a high-stability internal oscillator. An example of such a system 100 including a tracker device 110 and a transponder 150 attached to a hidden object (here, a lost dog 155) may be better understood with reference to FIGS. 1–2.

In operation of exemplary system 100, a person holding tracker 110 can determine the spatial position of tracker 110 relative to transponder 150 and, based on repeated updates to that position determination, locate dog 155. By maintaining phase stability responsive to a broadcasted signal from broadcast transmitter 105, both tracker 110 and transponder 150 cooperate to permit highly accurate (e.g., about 4% of a wavelength) distance determination while omitting the expense and bulk of high-stability oscillators.

Figure 2:
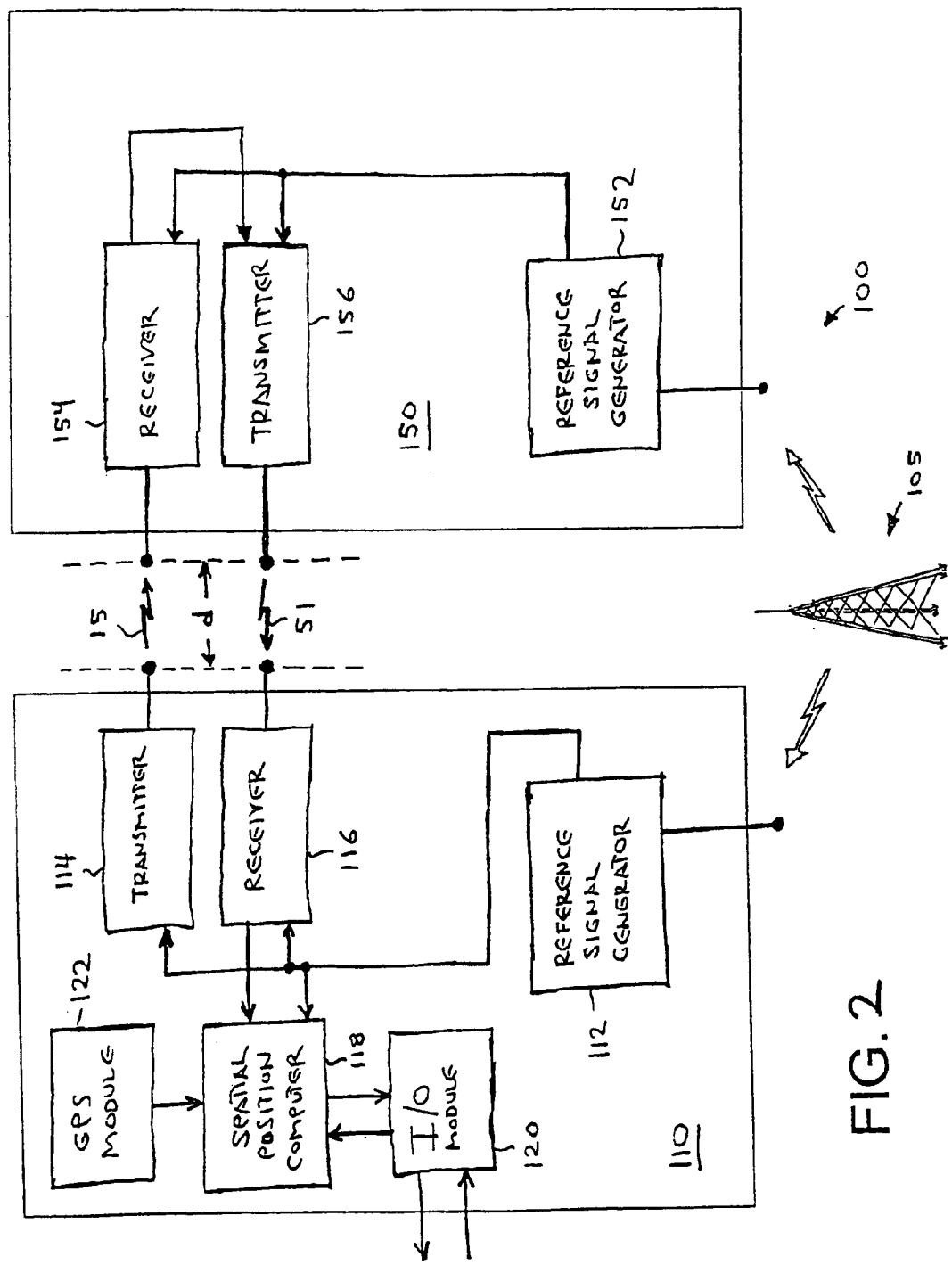
FIG. 2 is a schematic block diagram of the tracker and transponder devices of FIG. 1.

FIG. 2 schematically depicts functional modules that tracker 110 and transponder 150 implement. These functional modules can be suitably implemented by hardware, software, or both. Functional modules can interact via any suitable routes of interconnection, including hardware (e.g., a bus, dedicated signal lines, etc.), access to shared storage media (e.g., arguments and returned values of function calls in RAM media, dual-access RAM, files residing on hard disk media, etc.), and combinations of hardware and shared media access.

Tracker 110 implements functional modules including: a reference signal generator 112; a transmitter 114 and a receiver 116, both coupled to generator 112; a spatial position computer 118 coupled to receiver 116 and generator 112; and an I/O module 120 coupled to computer 118 and to a suitable user interface not shown in FIG. 2. Tracker 110 can also include a GPS (Global Positioning System) module 122, which can advantageously cooperate with spatial position computer 118 as discussed below.

Transponder 150 implements functional modules including: a reference signal generator 152; a receiver 154; and a transmitter 156. Receiver 154 and transmitter 156 are both coupled to generator 152. They are also coupled to each other such that output of receiver 154 controls transmitter 156.

Tracker 110 and transponder 150 include some of the same types of functional modules. Both devices include reference signal generators, transmitters, and receivers. These functional modules can be implemented by similar or identical hardware in both devices, with different software for causing them to operate appropriately for tracker 110 or transponder 150. For example, transmitter 114 and receiver 116 in tracker 110 do not couple to each other. Thus, software in tracker 110 need not cause transmitter 114 to control receiver 116.

A reference signal generator according to various aspects of the invention includes any hardware or software, or combination of both, that is phase-stabilized by a broadcasted signal. With its consequent phase stability, such a generator can phase-stabilize other functional modules. A functional module or device is phase-stabilized by a broadcasted signal when the phase stability of its internal operations and output signal(s) is not substantially worse than if controlled by an internal clock having phase stability as good as that of the broadcasted signal. In other words, the output of a device phase-stabilized by a broadcasted signal has phase stability nearly as good as that of the broadcasted signal itself. If a broadcasted signal's phase stability were such that it has phase noise of only −100 dBc at +/−100 Hz, for example, an output signal from a device phase-stabilized by the signal would not be expected to have phase noise of −50 dBc at +/−100 Hz, even if that were the phase stability of the device's internal oscillator. As another example, if the broadcasted signal's phase stability were such that the signal's frequency always remained within 0.01 ppm of average, the phase-stabilized device would not be expected to produce an output signal deviating 10 ppm from average.

Reference signal generators 112 and 152 of devices 110 and 150 are both phase-stabilized by a broadcasted signal from broadcast transmitter 105. In the example of FIGS. 1 and 2, transmitter 105 is a commercial AM broadcast transmitter operating at a frequency between about 500 kHz and about 1600 kHz. Such transmitters have operating ranges of at least several miles, and their signal quality tends to degrade gradually rather than abruptly. Consequently, dog 155 of FIG. 1 (with transponder 150) and tracker device 110 (typically carried by the dog's owner) are both likely to be within the coverage zone of transmitter 105.

In a particularly advantageous configuration according to various aspects of the invention, a reference signal generator phase-stabilizes other functional modules to a degree of stability greater than the generator's system clock granularity would conventionally permit. For example, conventionally performing a phase adjustment to a direct digital synthesis (DDS) module by skipping or effectively doubling a cycle of a 24 MHz system clock (one of many possible frequencies) induces a phase granularity of $\frac{1}{24}$ MHz, or 42 nanoseconds. This equates to 203 degrees of a 13.56 MHz transmit/receive frequency cycle (again, one of many possibilities), which is clearly unacceptable for a phase-based distance measurement system.

Advantageously, a reference signal generator according to various aspects of the invention can achieve its high level of performance without the need for analog phase locking. As discussed below with respect to a specific embodiment and with reference to FIGS. 4–6 and 10–15, this phase stabilization is performed using a combination of sync pulses and qualified sync pulses.

A transmitter according to various aspects of the invention includes any hardware, software, or combination of both capable of transmitting an output signal as field radiation, via a suitable coupling device. Any suitable type of radiation in any suitable field can be employed, including sound waves below, within, or above the range of human hearing in air or water, and electromagnetic radiation in the RF, infrared, or visible light spectrum. Suitable coupling devices include antennas (e.g., loops, whips, directional arrays, etc.) for coupling to an RF field and piezoelectric transducers for coupling to an acoustic field.

The many different types of transmitters suitable for various embodiments of the invention operate with widely varying output levels and signal frequencies. For example, an acoustic transmitter for use in the ocean (e.g., to track movements of marine mammals) may have a relatively high output level and a particular frequency selected for accuracy, range, avoiding interference with other tracking systems, and minimal adverse impact to the mammal. An optical transmitter aimed from the earth to its moon may operate at a very high output power to overcome the significant path loss between the two distant bodies.

Government regulations may severely restrict the output levels and signal frequencies that RF transmitters can employ in determining positions of terrestrial objects. In a preferred implementation of exemplary system 100 (FIG. 2), transmitters 114 and 156 advantageously operate with an output level of less than one microwatt, at a frequency of 13.56 MHz, with the only modulation being periodic four-second bursts of a carrier wave. Harmonics are attenuated by 30 dB. This operating arrangement complies with regulations promulgated by the Federal Communications Commission, Part 15 (Section 15.209) for unlicensed transmitter operation. T. Warnagiris, "Legal Unlicensed Transmitting," in Applied Microwave & Wireless, Spring 1996, pp. 32–54, which is incorporated herein by reference, provides guidance for implementation of other unlicensed embodiments.

In the preferred implementation of system 100, calculated field strength at 30 meters from transmitters 114 and 156 is 140 microvolts per meter. Even at this very low power level, system 100 can achieve high accuracy, for example detecting three-foot (4% at 13.56 MHz) distance changes at 500 feet of separation and distance changes of about 1.5 foot (2%) at 50 feet of separation. Longer integration times than the four seconds employed in exemplary system 100 can yield even better accuracy or range at this low transmit power level.

A variation employing licensed transmitters can operate with significantly higher power levels for greater range and reliability. In such a variation or others, the transmit and receive frequencies of tracker 110 can be randomly assigned within a narrow band to reduce the probability of interference with other systems operating in the vicinity. In a variation employing direct sequence spread spectrum transmission (DSSS), pseudo random sequence codes can be randomly assigned to likewise avoid interference. Depending on local regulations, it may be possible to employ higher transmit power levels in an unlicensed DSSS variation because the spread spectrum transmission interference in a given narrow frequency range is lower than narrowband transmission interference within such a range.

A receiver according to various aspects of the invention includes any hardware, software, or combination of both capable of receiving an input signal coupled to it via field radiation and a coupling device of any suitable type, e.g., whip antenna 112 of FIG. 1. As with a transmitter, any suitable type of radiation in any suitable field can be employed. Preferably, a transmitter and receiver employ the same coupling device. The transmitter and receiver can be suitably isolated from each other by conventional hardware such as a high-Q resonant device (in variations where the transmitter and receiver operate at different frequencies), unidirectional (e.g., ferromagnetic) circuitry, or a single-pole double-throw switch.

By coupling tracker 110 and transponder 150 together via RF electromagnetic field radiation, system 100 permits determination of a spatial position of tracker 110 relative to transponder 150. This spatial position can be expressed as a physical measure of distance, depicted with arrow "d" in FIG. 2. In advantageous variations, the spatial position can be expressed as an offset from a previous spatial position or as an azimuthal angle from tracker ~110 to transponder 150. For example, a particular spatial position may be expressed as an azimuthal angle of 90 degrees, in which case transponder 150 is directly east of tracker 110.

Transmitter 114 in tracker 110 transmits a forward signal 15 to receiver 154 in transponder 150. Transmitter 156 in transponder 150 replies with a return signal 51, which is received by receiver 116 in tracker 110. Both reference signal generator 152 and receiver 154 couple to and control the output phase of transmitter 156. In exemplary transponder 150, receiver 154 sets the output phase of transmitter 156 to the phase it receives of forward signal 15. (Of course, all such phases are relative to respective phase offsets induced by intervening signal processing.) Thus, changes in phase of return signal 51 are substantially determined by changes in distance "d," which successive measurements can detect. A given change in distance "d" results in a phase change in return signal 51 (when received at receiver 116) that is proportional to twice the change in distance.

Receiver 154 and transmitter 156 are both phase-stabilized by reference signal generator 152. Thus, additional phase instability of return signal 51 over that of forward signal 15 substantially corresponds to phase instability of the broadcasted signal from transmitter 105.

Figure 3:
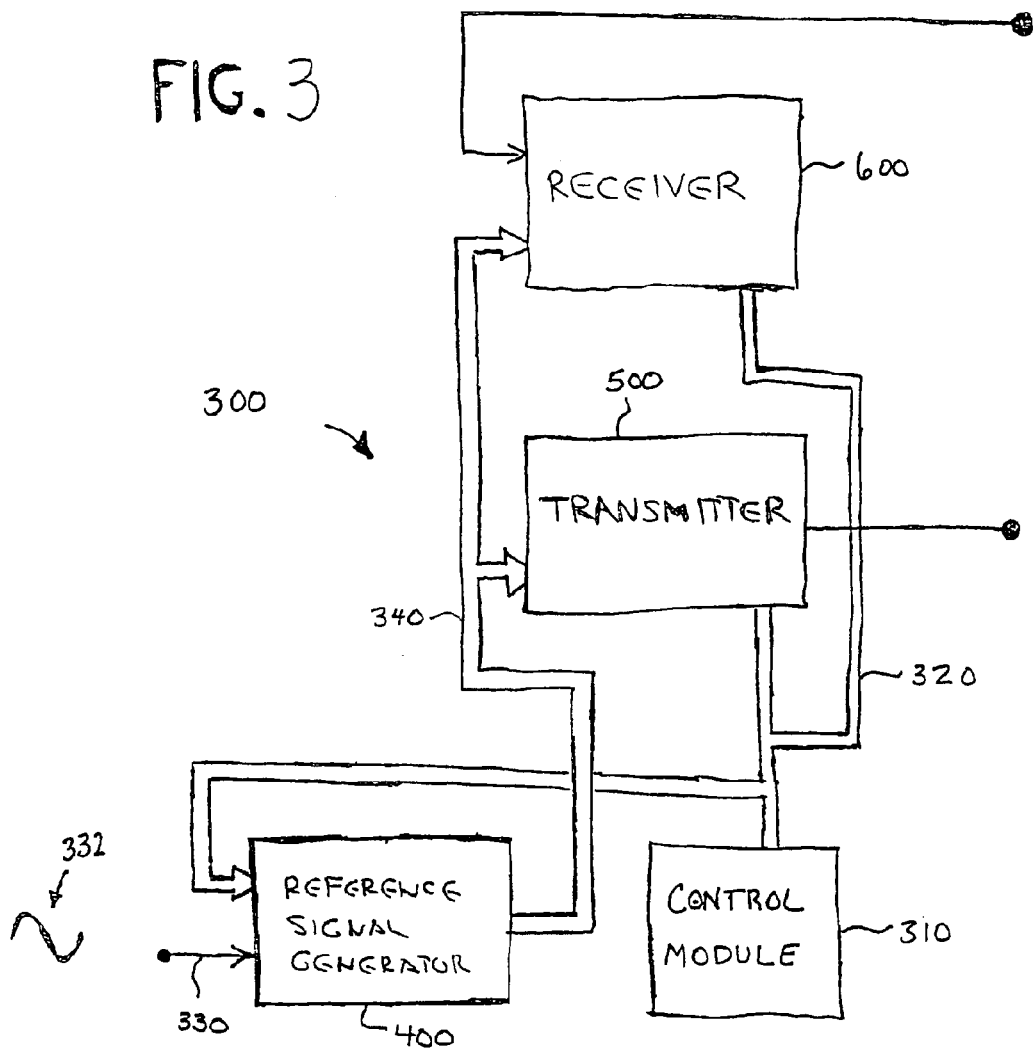
FIG. 3 is a schematic block diagram of a signal processing system that can be employed in the tracker and transponder devices of FIG. 2.

An exemplary device 300 that implements a reference signal generator 400 and a transmitter 500 and receiver 600, phase-stabilized by generator 400 to a broadcasted signal 332 according to various aspects of the invention, may be better understood with reference to FIG. 3. Operation of device 300 and its generator 400, transmitter 500, receiver 600, and other components are discussed in the context of an advantageous embodiment that illustrates benefits of various aspects of the invention when such aspects are employed. However, certain aspects can provide benefits even when various other aspects are omitted. In addition, device 300 need not be employed as tracker 110 or transponder 150 of system 100 (FIGS. 1–2), though such is presently preferred. Thus, neither this nor any other example provided herein should be considered as limiting the scope of the invention in any way; that limiting function is reserved exclusively for the issued claims.

Device 300 includes various analog and digital components mounted on a printed circuit board. These components are conventionally arranged and are omitted from FIG. 3 for clarity. Digital components include: a microcontroller (e.g., a P1C16C73); an FPGA (e.g., a XILINX XCS30XL); and miscellaneous support circuits (e.g., a 27C256 EPROM coupled to a 4040 counter to provide clock signals, etc.).

Analog components include: a crystal (e.g., 24 MHz) coupled to the microcontroller to provide a main system clock; voltage regulators (e.g., separate TPS76950 5-volt regulators for digital and analog components, a 78L033 3.3-volt regulator); decoupling capacitors; and RF circuitry for implementing generator 400, transmitter 500, and receiver 600.

For implementation of reference signal generator 400, RF circuitry of exemplary device 300 suitably includes: an MMBF4416 FET and TK1235 RF transformer, coupled together (gate to transformer via coupling capacitor) along with associated RLC (resistor, inductor, capacitor) components for amplification of broadcasted signal 332; an NE602 mixer and associated RLC components; a 455 kHz ceramic filter; an LM7131 op-amp with associated RLC components to serve as an IF amplifier; and an LM311 op amp/comparator with associated components, including a resistor-capacitor "L-network" coupled to the LM311's inverting input for comparator hysteresis.

For implementation of receiver 500, RF circuitry of device 300 suitably includes circuitry similar to that implementing generator 400. The TK1235 RF transformer is preferably replaced with a TK1237 version, and RLC component values suitably adjusted, to account for the different frequency of operation employed in receiver 500.

For implementation of transmitter 600, RF circuitry of device 300 suitably includes: an MMBF4416 FET and TK1235 RF transformer, coupled together with associated RLC (resistor, inductor, capacitor) components for amplification of an output signal to be transmitted; and a pair of ZC2811E diodes separated by an LM7131 op-amp stage (inverting, with DC bias of 2.5 volts) and selectably biased for on/off control of the transmitter output signal.

Figure 4:
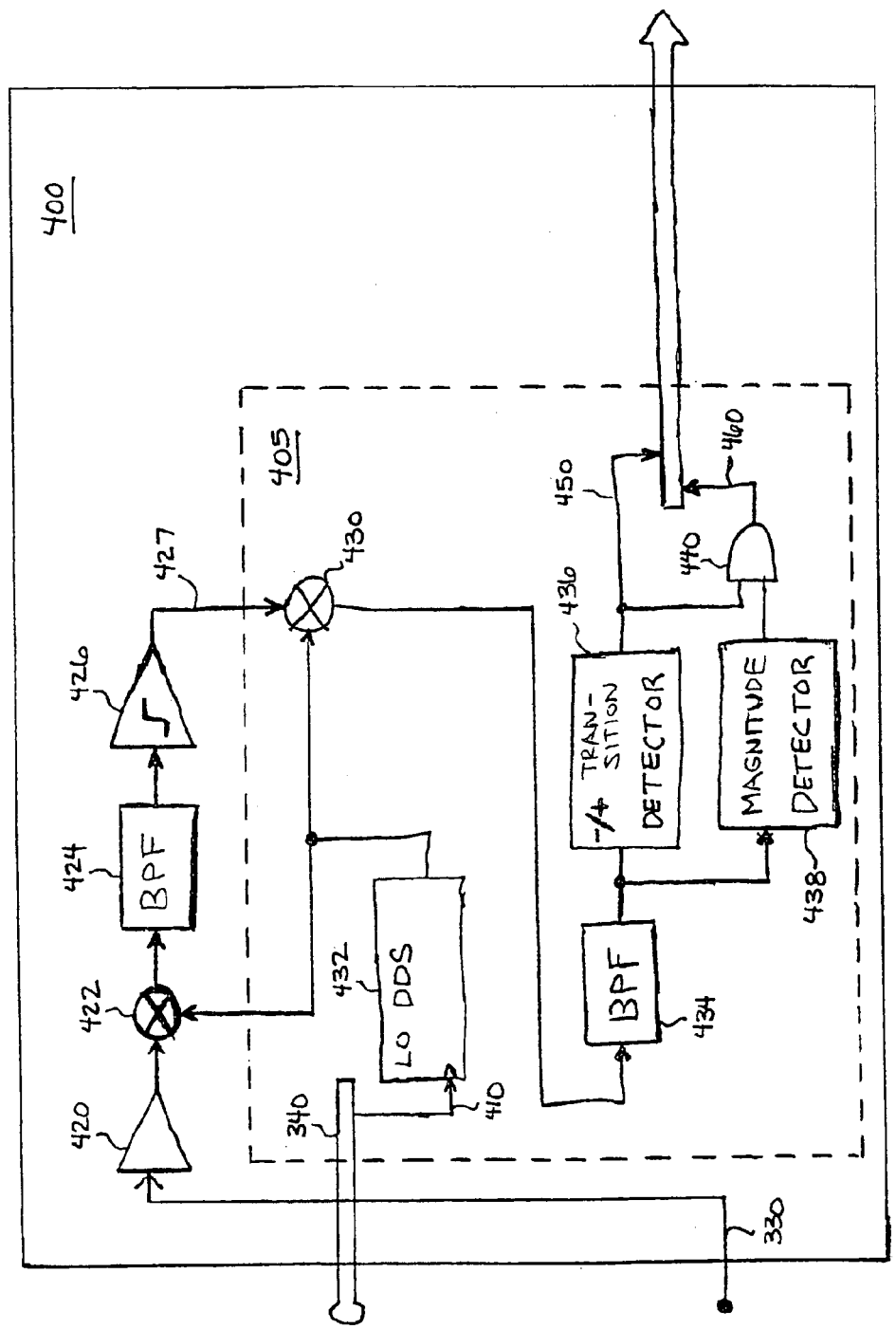
FIG. 4 is a schematic block diagram of a reference signal generator in the signal processing system of FIG. 3.
Figure 5:
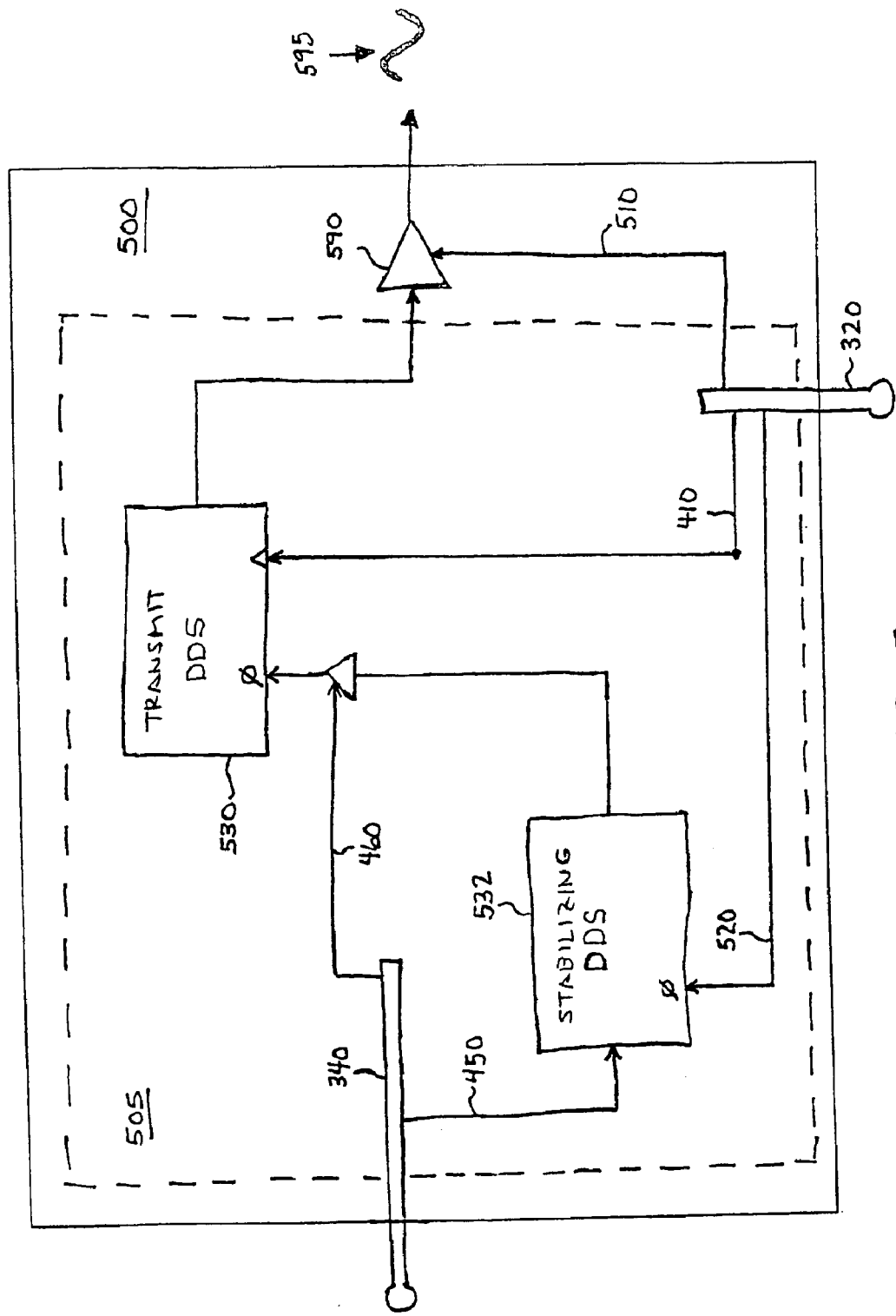
FIG. 5 is a schematic block diagram of a transmitter in the signal processing system of FIG. 3.
Figure 6:
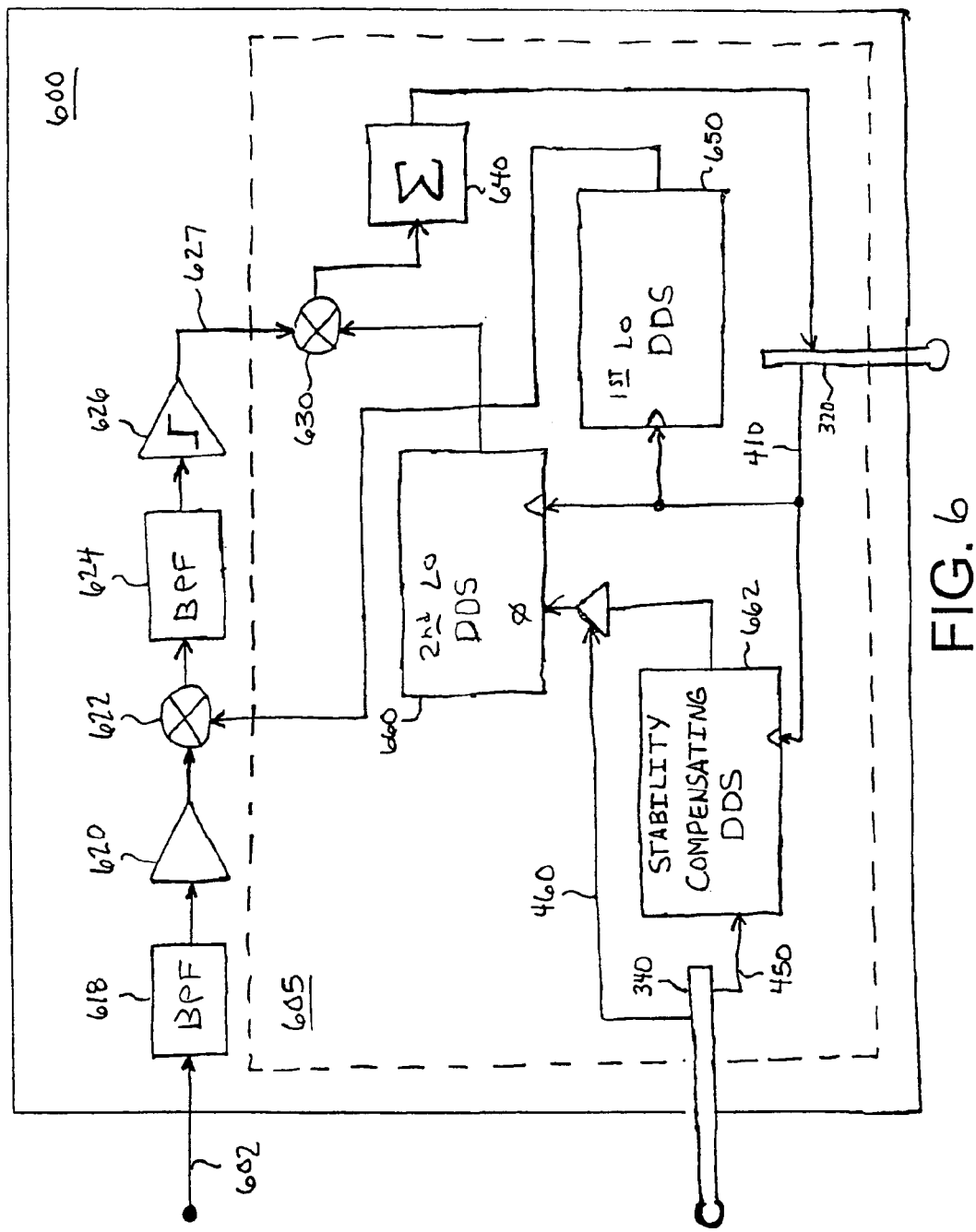
FIG. 6 is a schematic block diagram of a receiver in the signal processing system of FIG. 3.

Device 300 (FIG. 3) further includes a control module 310 coupled to reference signal generator 400, receiver 600, and transmitter 500 via a number of data lines, represented as a group in FIG. 3 by a bus 320. Some of these data lines are illustrated in FIGS. 4–6. These include: a main system clock line 410; a transmit control line 510; a phase integrator output line 610; and a phase control line 520, which may be omitted if device 300 is used as a tracker in system 100. Data lines in bus 320 need not be physically grouped together or have any particular physical form. In a variation where large portions of generator 400, receiver 600, and transmitter 500 are implemented by software in a DSP, particular "data lines" may be implemented by an intangible passing of arguments from one software function to another.

Exemplary reference signal generator 400 produces two output signals of sync pulses (unqualified and qualified types), which are represented as a group in FIGS. 3–6 by a bus 340. Generator 400 phase-stabilizes the signals in bus 340 to broadcasted signal 332, which may be received from any suitable broadcast source like transmitter 105 of FIGS. 1–2. Generator 400 receives signal 332 via a broadcasted signal line 330 (FIGS. 3–4).

The internal operation of exemplary reference signal generator 400 may be better understood with reference to FIG. 4. Generator 400 includes an analog signal processing subsystem having an RF amplifier 420, a mixer 422, a bandpass filter 424, and a comparator 426. Signal line 330 couples broadcasted signal 332 to RF amplifier 420, which couples the signal to mixer 422 with frequency selectivity (e.g., for image rejection) and suitable amplitude. Mixer 422 frequency translates the selectively amplified signal to an IF (intermediate frequency), which is 455 kHz in exemplary generator 400. Bandpass filter 424 rejects spurious output signals from mixer 422 and defines selectivity of reference signal generator 400 to one, and only one, broadcasted signal. (In variations discussed below, a reference signal generator is made responsive to multiple broadcasted signals.) Comparator 426 acts as a 1-bit A/D converter, providing a logic high signal on line 427 when the output signal from filter 424 exceeds a predetermined threshold and providing a logic low signal on line 427 otherwise.

Reference signal generator 400 further includes a digital signal processing (DSP) subsystem 405. This subsystem is preferably implemented within a single FPGA with DSP subsystem 505 of transmitter 500 and DSP subsystem 605 of receiver 600.

Signal line 427 enters DSP subsystem 405 and couples to a second mixer 430 implemented in subsystem 405. Mixer 430 is controlled by the same local oscillator signal as mixer 422. Consequently, mixer 430 frequency translates the filtered, 1-bit signal on line 427 to the same frequency as broadcasted signal 332 on line 330. The local oscillator signal controlling both mixers comes from local oscillator (LO) generator 432.

Generator 432 is a direct digital synthesis (DDS) module, commonly called a frequency synthesizer. In accordance with various aspects of the invention, such a module includes any functional module implemented by any suitable hardware, software, or combination of both that produces a periodic output signal by adding a predetermined increment to a phase accumulator. A DDS module typically achieves a periodic output by modulo-adding the increment with a predetermined modulus. Generator 432 produces a 1-bit output, which drives digital mixer 430 and, through an output port of the FPGA implementing DSP subsystem 405, analog mixer 422.

Generator 432 is not phase-stabilized to any broadcasted signal, and consequently its phase (and frequency) varies with variations in the frequency of the clock (not shown) controlling DSP subsystem 405. Because mixers 422 and 430 perform complementary frequency translations, however, the output of first mixer 430 is phase-synchronous with the input of second mixer 422.

The output of mixer 430, a 1-bit facsimile of the input to mixer 422, couples to a bandpass filter 434 for translation into a sinusoid that that very closely approximates a carrier of the selected broadcasted signal 332 on line 330. In exemplary reference signal generator 400, filter 434 is an IIR bandpass filter having a single pole pair (i.e., second-order) operating with 24-bit precision in its coefficients and output signal.

Generator 432 facilitates selection of a broadcasted signal for phase stabilization from a plurality of available broadcasted signals by making filter 434 digitally tunable. (Other techniques, many of them less convenient than that of generator 432, can be employed, e.g., local oscillator adjustment.) When device 300 is to operate in the San Francisco Bay area, for example, coefficients of filter 432 can be predetermined such that filter 432 has a center frequency at 810 kHz, the operating frequency of radio station KGO. The coefficients are selected such that filter 434 has exceptionally high Q, e.g., a bandwidth of about 60–80 Hz at the exemplary center frequency of 810 kHz. Coefficients can be generated "on the fly" using conventional filter design equations. Alternatively, a lookup table can be provided containing coefficients for all available broadcasted signals, e.g., all of the approximately 100 AM broadcast channels available in the U.S.

Reference signal generator 400 requires no analog phase locking for its operation. Surprisingly, generator 400 can still phase stabilize transmitter 500 and receiver 600 to a degree of stability greater than that which the 24 MHz clock of system 300 would conventionally permit. This advantageous phase stabilization is performed using a combination of sync pulses (on signal line 450) and qualified sync pulses (on line 460).

In exemplary generator 400, negative-to-positive transition detector 436 derives sync pulses from zero crossing transitions of a highly filtered broadcasted signal (output from filter 432). With any clocked digital system, such transitions can only be determined to within a particular window of time uncertainty, which is proportional to the finite period of the generator's system clock. For example, an observed zero crossing transition may occur just before it is observed (upon transition of one system clock cycle), or it may occur nearly one full system clock cycle earlier, just after the previous system clock cycle has halted observation.

Qualified sync pulses are selected sync pulses that occur during conditions meeting one or more predetermined criteria. Magnitude detector 438 and "AND" gate 440 cooperatively produce qualified sync pulses when detector 436 has produced a corresponding sync pulse within a predetermined time before or after an actual zero crossing. In other words, qualified sync pulses are produced when the time uncertainty induced by clock granularity (e.g., $\frac{1}{24}$ MHz clock period) randomly permits a close match between the (unqualified) sync pulse and the actual event triggering it. This close match will typically occur when the trigger event occurs very shortly before or after transition of the generator's system clock.

Generator 400 employs zero crossing transitions as a trigger event. This configuration is advantageous in that it allows signal magnitude around the zero crossing to be employed as a qualifying criterion for qualified sync pulses. Magnitude detector 438 determines whether the zero crossing transition was observed close enough to the actual zero crossing that the signal level was less than or equal to a predetermined threshold (e.g., $\frac{1}{64}$ its maximum value) at the observation time. If it was, the sync pulse (on line 450) resulting from the observation is considered close enough to being an accurate observation of its trigger event to be accompanied by a qualified sync pulse, on line 460.

In variations, any predictable point along the cycle of a periodic signal (to a resolution limited by system clock granularity) can be employed as a trigger for a sync pulse and an associated qualifying criterion for a qualified sync pulse. For example, the point at which a signal reaches a predetermined threshold with a differential of a given sign (plus or minus) can be employed as a trigger. The differential between the signal level and the threshold can be employed as a qualifying criterion.

Sync pulses on line 450 and qualified sync pulses on line 460 are represented together in FIGS. 3–6 by bus 340. Again, this is only an illustrative grouping; no particular physical bus structure is required. As discussed below, the sync pulse on line 450 and qualified sync pulse on line 460, in accordance with various aspects of the invention, form a powerful team of signals that facilitate completely digital stabilization of phase well beyond the resolution of the system clock period.

Reference signal generator 400 couples sync pulses and qualified sync pulses to various DDS modules in transmitter 500 and receiver 600 for phase stabilization, via bus 340. In accordance with various aspects of the invention, these and other types of devices can be phase-stabilized by including (1) a first DDS module whose phase accumulator is clocked by sync pulses, and a (2) second DDS module whose phase accumulator is clocked by system clock pulses but forced to the accumulated phase of the first DDS module when a qualified sync pulse occurs. The occurrence of a qualified sync pulse indicates that the first DDS module was last clocked by a sync pulse that was produced suitably close to a predetermined trigger event. That event is a predictable, consistent point along a periodic cycle of the broadcasted signal being employed for phase stabilization.

When the serendipitously accurate clocking occurs, the output of the first DDS module accurately represents the phase that the second DDS module should have at that instant to achieve a desired phase stability and/or deviation. (As discussed below with reference to FIG. 6, a predetermined phase deviation can actually be induced in a DDS module to impart overall phase stability.) As discussed below, a less accurate system clock, i.e., a clock operating further from its expected frequency, causes the accumulated phase of the second DDS module to be further deviated from the accumulated phase of the first DDS module. In such cases, the second DDS module's accumulated phase undergoes more significant correction when qualified sync pulses occur.

An example of phase stabilization according to various aspects of the invention may be better understood with reference to the simulated signal plots of FIGS. 10–15. A computer program listing below provides code that was executed with the Octave numerical language environment (similar to MATLAB) to produce these plots.

Figure 10:
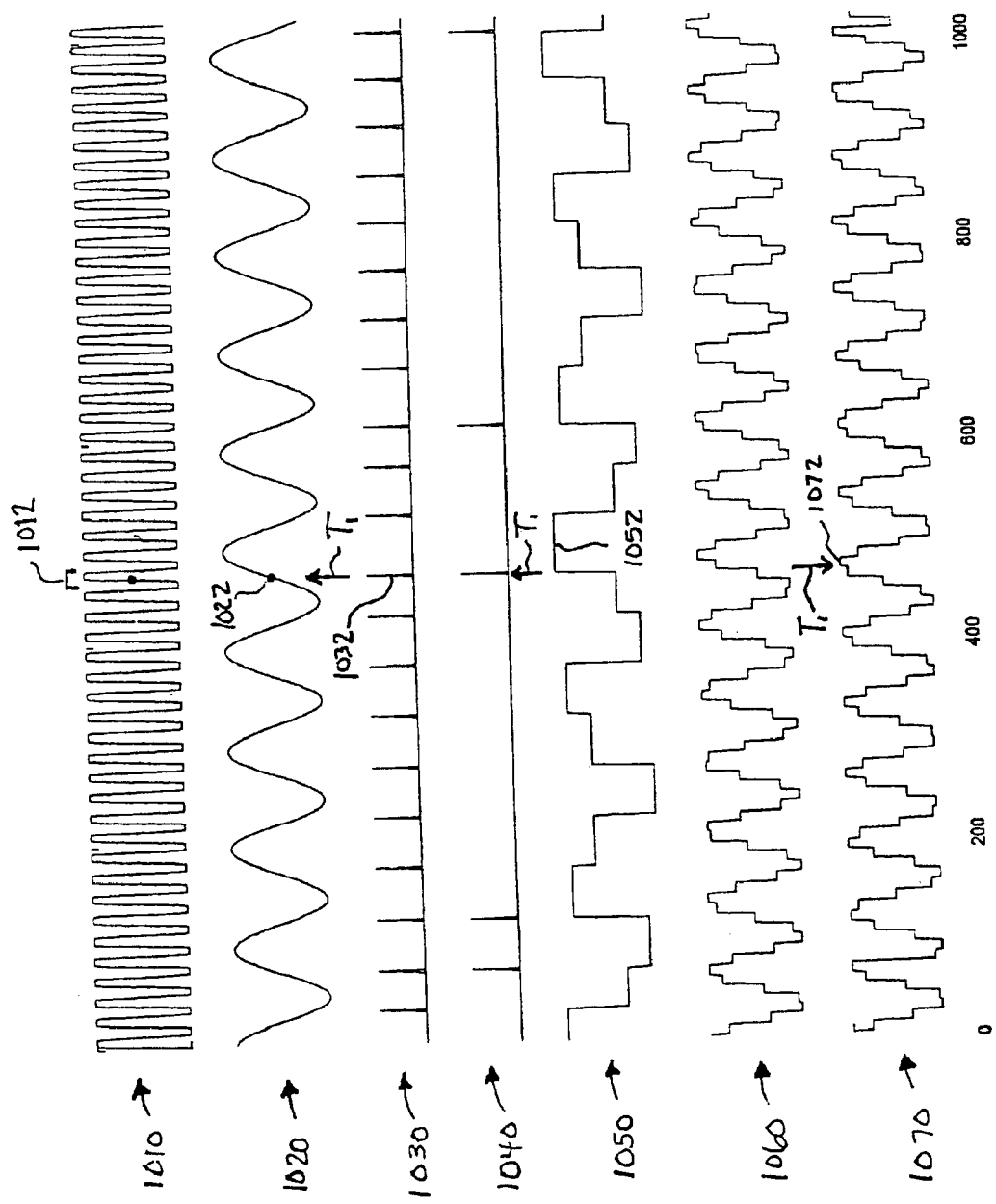
FIG. 10 illustrates multiple signals produced during a simulation of phase stabilization according to various aspects of the present invention with a fairly accurate system clock frequency.
Figure 11:
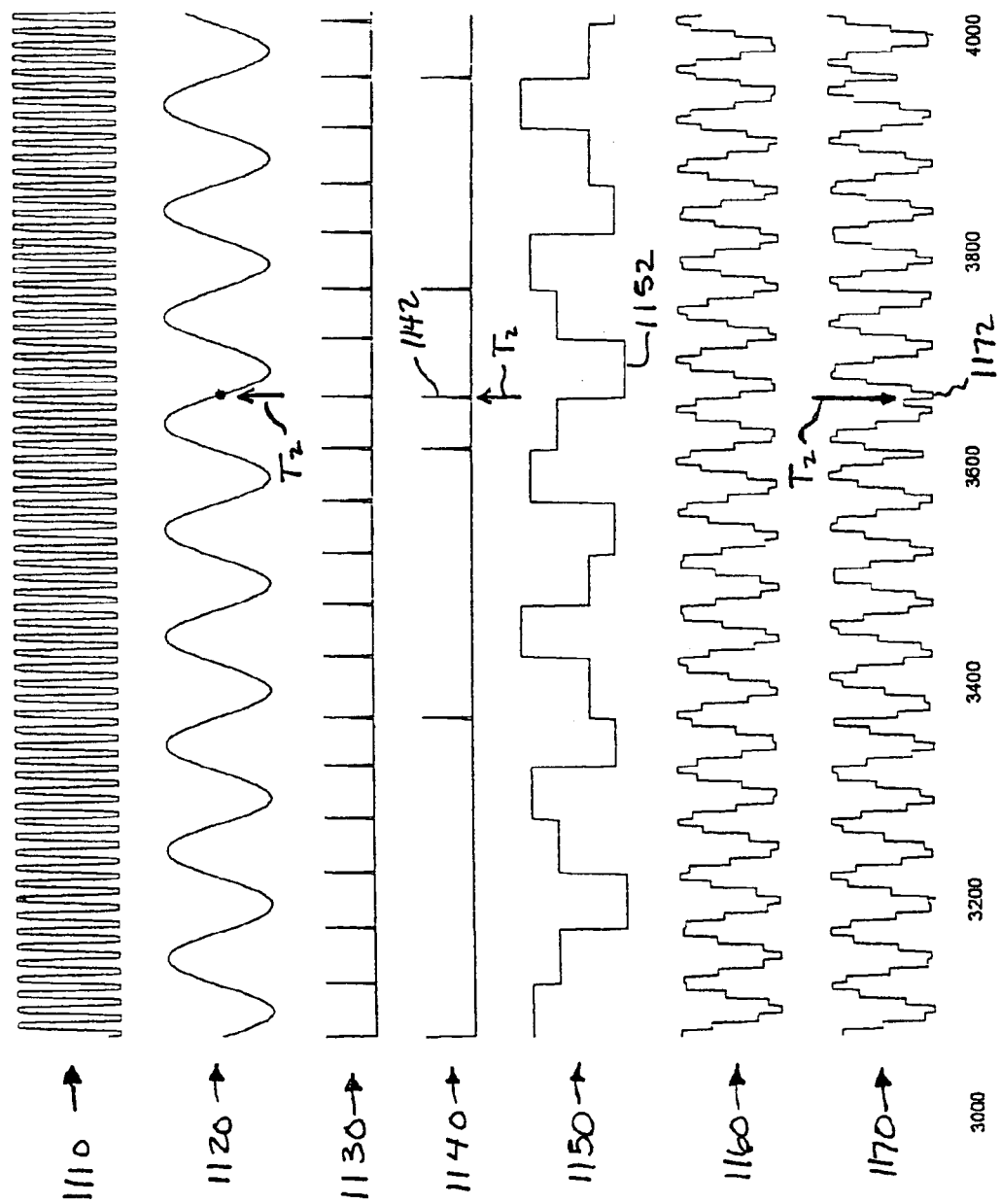
FIG. 11 illustrates multiple signals produced during a simulation of phase stabilization with a less accurate system clock frequency.

FIGS. 10 and 11 illustrate multiple signals produced during the simulation with (1) a fairly accurate system clock frequency, and (2) a less accurate clock frequency. The signals depicted are: a system clock having segments 1010 (FIG. 10) and 1110 (FIG. 11); a broadcasted signal with segments 1020, 1120 on which phase stabilization is based; sequences 1030, 1130 of regular (unqualified) sync pulses; sequences 1040, 1140 of qualified sync pulses; a sinusoid-transformed rendition of a phase stabilization signal having segments 1050, 1150; an unstabilized output signal with segments 1060, 1160 (illustrated for comparison); and a stabilized output signal having segments 1070, 1170.

In the simulation, the nominal clock frequency is modeled at 24 MHz. The frequency of the broadcasted signal (segments 1020 and 1120 of FIGS. 10 and 11) is modeled at 5 MHz, and the desired frequency of the output signal is modeled at 3.5 MHz. The 24 MHz clock frequency is sometimes employed in FPGA devices currently available, and 5 MHz is one of the frequencies of NISI broadcast transmitter WWV. However, these are only exemplary signals and frequency values, which do not in any way limit the possible signals employed during implementation of the invention.

The simulation generated 4096 data points for each signal, with each point representing approximately $\frac{1}{20}$ of a system clock cycle at its expected frequency of 24 MHz. The points are too close together to be individually identifiable in the plots of FIGS. 10–15, but they provide a convenient reference frame on the X-axis (i.e., the time axis) of the plots of FIGS. 10–13.

FIG. 10 depicts the simulated signals in the interval from points 0001 through 1024. During this interval, five qualified sync pulses occur, in sequence 1040. The simulation generated these qualified sync pulses when it had generated a corresponding sync pulse in sequence 1030 sufficiently close to a zero crossing of the $r_1$ broadcasted signal in segment 1020. The simulation qualified this closeness to the zero crossing using the criterion that the broadcasted signal have an amplitude less than 15% of its maximum. (For clarity of illustration, this simulation criterion was set much higher than the 1/64=1.5% criterion of reference signal generator 400 of FIG. 4.) This portion of the simulation, and the method it exemplifies, may be better understood with reference to lines 52–65 of the program listing below.

During its segment 1010 within this interval, the system clock was fairly close to its expected frequency. See lines 10, 26, and 30–31 of the program listing for a better understanding of how the simulation modeled a time-varying deviation in system clock frequency.

In their respective segments 1060 and 1070 within the 0001–1024 point interval of FIG. 10, the unstabilized output signal and the stabilized output signal look very similar. This similarity exists because the accumulated phase of the stabilized DDS module (simulated at lines 100–115 of the program listing) did not undergo a very dramatic correction when qualified sync pulses of sequence 1040 occurred, e.g., at time $T_1$.

At time $T_1$, system clock transition 1012 caused the simulated system to observe a zero crossing transition 1022 and generate a sync pulse 1032 shortly after the transition actually occurred. (To keep the plots compact, both positive and negative clock transitions were recognized.) The observation was accurate enough that the broadcasted signal in segment 1020 was unable to reach 15% of its maximum amplitude by the time the observation was made. Consequently, the simulated system generated a qualified sync pulse 1042 in sequence 1040.

Qualified sync pulse 1042 forced the phase accumulator of the stabilized DDS module to the accumulated phase of a stabilizing DDS module, which was simulated at lines 76–85 of the program listing. Portion 1052 of the DDS module's phase stabilization signal is at the accumulated phase (transformed to a sinusoid in FIG. 10) to which qualified sync pulse 1042 forced the stabilized DDS module. This forcing caused the stabilized output signal in segment 1070 to reach a very slightly different amplitude at portion 1072, upon transition of the system clock, from what it would have without forcing. Because the system clock in segment 1010 is close to its expected frequency, the forcing is not visually apparent in segment 1070 of the stabilized output signal.

In the interval from about points 3084 through 4096, depicted in FIG. 11, the effect of phase stabilization according to various aspects of the invention is much more apparent. During its segment 1110 within this interval, the system clock was significantly deviated from its expected frequency. A visual comparison shows that the clock frequency in segment 1110 was significantly higher than in segment 1010.

The broadcasted signal had the same frequency in both segment 1120 and segment 1130, which is consistent with the broadcasted signal being from a source that is phase stable. Although the invention does not require a broadcasted signal to have any minimum phase stability, it does not make much sense in typical implementations to phase stabilize an output to a highly unstable signal.

At time $T_2$, as at time $T_1$ of FIG. 10, the occurrence of a qualified sync pulse 1142 forces the output DDS module's phase accumulator to the value of the phase stabilization signal in sinusoid-transformed segment 1150, at portion 1152. Here, this forcing causes the stabilized output signal in segment 1170 to make a dramatic transition at portion 1172. This transition results in a significant phase change, visibly stretching the negative half-cycle of the stabilized output signal.

Figure 12:
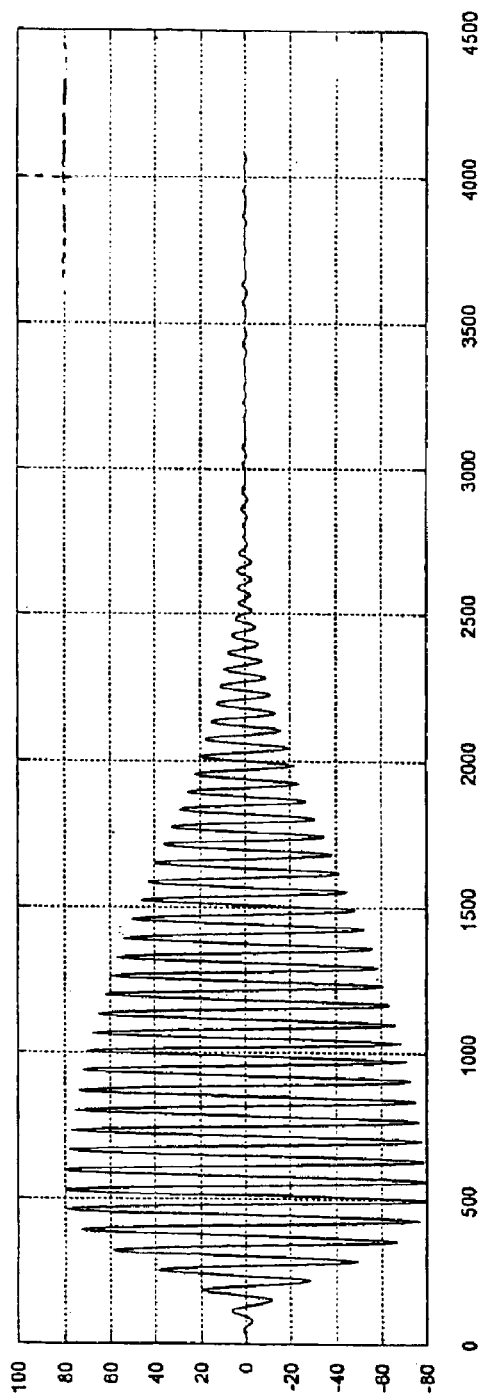
FIG. 12 illustrates a simulated bandpass-filtered output signal from an unstabilized DDS (direct digital synthesis) module using a system clock frequency that degrades in accuracy with time.
Figure 13:
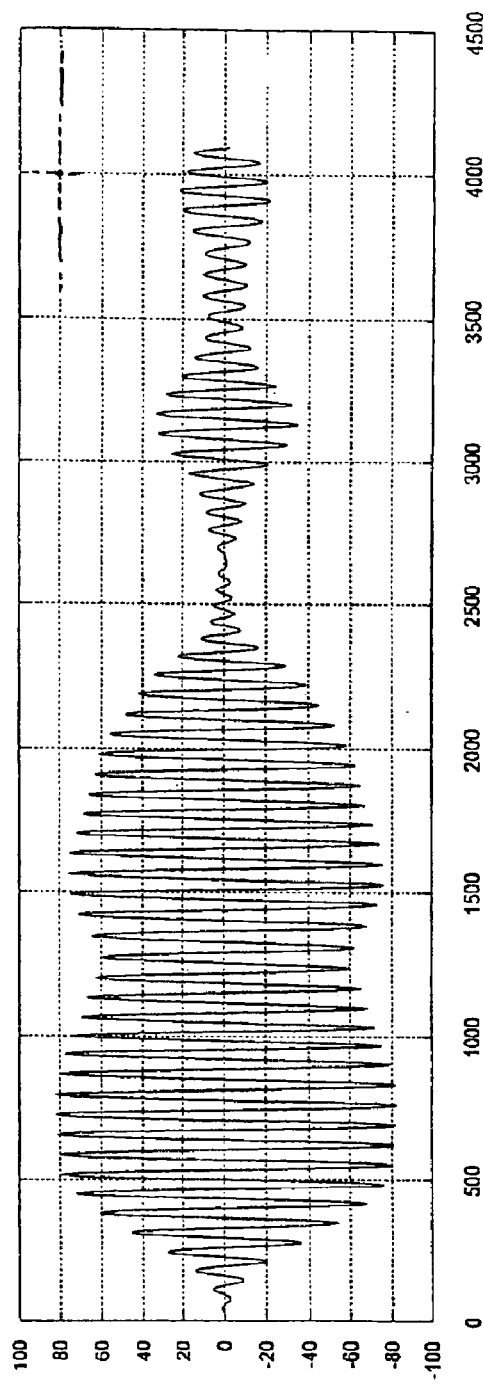
FIG. 13 illustrates a simulated bandpass-filtered output signal from a DDS module that is phase-stabilized in accordance with various aspects of the invention, using a system clock frequency that degrades in accuracy with time.

FIGS. 12 and 13 are time-domain plots of the unstabilized and stabilized output signals, respectively, after they passed through a filter having a narrow passband at the expected output frequency. (See lines 135–155 of the program listing.) These plots, which span the entire 4096 simulation points, illustrate how the frequency of the unstabilized output signal varied with system clock frequency and how the frequency of the stabilized signal resisted such variation.

At the beginning of the simulation, points 500–1000 (all references to simulation data points are approximate), the filtered outputs gradually rose to maximum amplitude, a phenomenon resulting from the filter impulse response rather than the output signal themselves. Between points 500–1000, the system clock remained within about 4% of its expected frequency (program listing, line 26), and both signals remained substantially within the narrow passband of the simulation's bandpass filter.

Between points 1000–2000, the system clock rose from about 4% greater than its expected value to a positive deviation of about 9%. In this interval, the difference in frequency between the unstabilized and stabilized output signals is visually noticeable in FIGS. 12 and 13. The unstabilized output signal (FIG. 12) steadily decreased in amplitude as its frequency drifted outside the filter passband. The stabilized signal (FIG. 13) remained within a 3 dB amplitude range as its primary frequency component remained substantially within the filter passband.

As the dock frequency continued to increase beyond point 2000, toward its maximum positive deviation of 25%, the unstabilized signal of FIG. 12 continued to drift further away from the simulation filter passband. The stabilized signal of FIG. 13 increased and decreased in amplitude, though a 3.5 MHz frequency component clearly remained within the passband of the simulation filter at various times. The simulation exemplifies that, even with the 10–25% deviation from an expected clock frequency, with the dramatic phase corrections illustrated in FIG. 11, phase stabilization according to various aspects of the invention can still operate under certain circumstances. In typical implementations, however, clock frequency deviations are likely to be measured in the parts per million, and maintaining consistent performance with such dramatic clock frequency deviations is then unnecessary.

Figure 14:
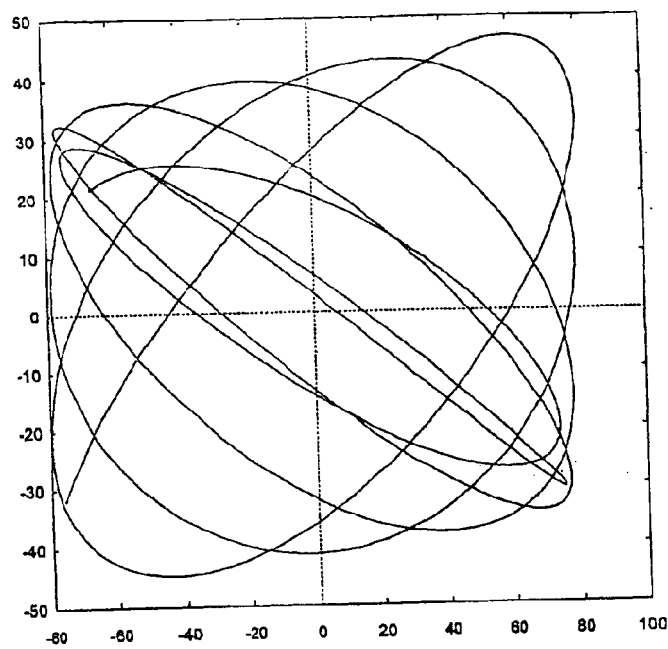
FIG. 14 is an X-Y plot of the unstabilized output signal of FIG. 12 with a first group of the signal's samples plotted on the X-axis and a second, later, group of the signal's samples plotted on the Y-axis.
Figure 15:
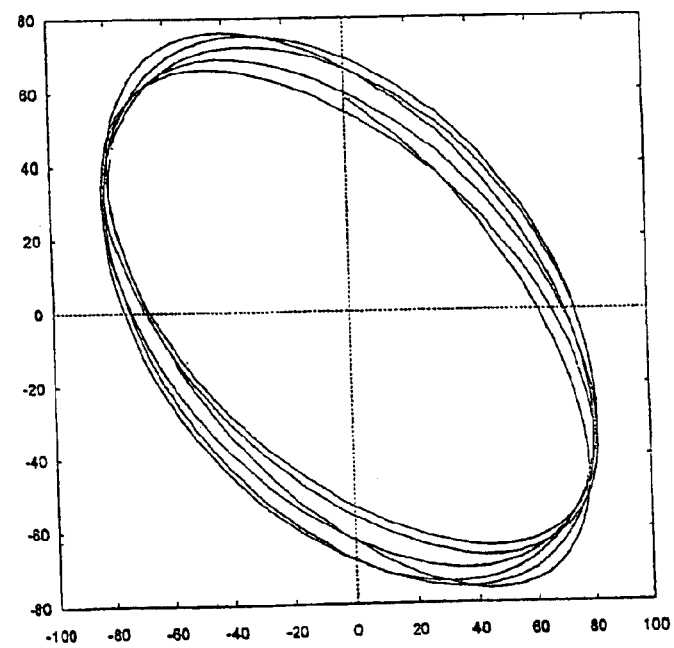
FIG. 15 is an X-Y plot of the stabilized output signal of FIG. 13 with a first group of the signal's samples plotted on the X-axis and a second, later, group of the signal's samples plotted-on the Y-axis.

Perhaps the clearest depiction of performance in the simulation of phase stabilization according to various aspects of the invention is found in the X-Y plots FIGS. 14 and 15. FIG. 14 depicts phase differences between two intervals of the unstabilized filter output signal, with the amplitude of points 500–900 plotted on the X-axis and the amplitude of points 1500–1900 plotted on the Y-axis. Phase increases of the signal in one region clearly outpaced those of the signal in the other region, and a frequency difference between the signal in the two regions is thus clearly apparent.

FIG. 15 depicts the same types of phase differences in the same regions (points 500–900 vs. points 1500–1900), but for the stabilized filter output signal. The clean ellipse of FIG. 15 is a clear illustration of the advantageous result of phase stabilization performed according to various aspects of the invention. With this simulated phase stabilization, the stabilized output signal maintained a relatively constant phase (and frequency) relationship even with clock frequencies varying between about 2% (simulation point 500) and about 8% positive deviation.

Exemplary device 300 of FIG. 3 includes a transmitter 500 and receiver 600 that are phase-stabilized in accordance with the various aspects of the invention discussed above. Functional modules of transmitter 500 are implemented mostly in a DSP subsystem 505. As illustrated in FIG. 5, exemplary transmitter 500 includes just one analog signal processing component: a selectable output amplifier 590. Control module 310 can enable or disable operation of amplifier 590 via transmit control line 510, which is part of bus 320 of FIG. 3.

DSP subsystem 505 includes a transmit DDS module 530, which is phase-stabilized to broadcasted signal 332 by a stabilizing DDS module 532. DDS modules 530 and 532 act cooperatively under control of sync pulses and qualified sync pulses from bus 340 to produce a transmit signal 595 that is phase-stabilized to broadcasted signal 332. Transmit DDS module 530 includes a phase accumulator (none are shown) that produces transmit signal 595 by having its value increased by a predetermined increment with each system clock cycle. The increment is set to the transmit frequency divided by the nominal system clock frequency.

Stabilizing DDS module 532 includes a phase accumulator that produces a phase stabilization signal by having its value increased by a predetermined increment with each sync pulse on line 450. The increment for stabilizing DDS module 532 is set to the transmit frequency divided by the broadcasted signal frequency. The increment is computed with a suitable modulus for phase increments beyond 360 degrees per sync pulse, i.e., when several transmit signal cycles are expected between each cycle of the broadcasted signal.

Qualified sync pulses appearing on line 460 force the phase accumulator of transmit DDS module 530 to the value of the phase stabilization signal from module 532. A similar process in another example is described above with reference to simulated signal plots of FIGS. 10–15. The phase-stabilized transmit signal is suitably amplified by amplifier 590 (when it is enabled by transmit control line 510) and the signal 595 is transmitted via a suitable coupling device, e.g., a whip or loop antenna, a piezoelectric transducer, etc.

Exemplary receiver 600 of FIG. 6 receives a signal at line 602 via a suitable coupling device, preferably the same device from which the transmitter 500 of FIG. 5 transmits signal 595. Receiver 600 includes an analog signal processing subsystem having a bandpass filter 618, an RF amplifier 620, a mixer 622, a bandpass filter 624, and a comparator 626. Signal line 602 couples the received signal to bandpass filter 618, which performs image rejection and protects RF amplifier 620 and mixer 622 from high-amplitude extraneous signals. Bandpass filter 618 couples the filter signal to RF amplifier 620, which amplifies it and overcomes the noise figure of mixer 622. Mixer 622 frequency translates the filtered and amplified signal to an IF (intermediate frequency), which is 455 kHz in exemplary receiver 600. Bandpass filter 624 rejects spurious output signals from mixer 622 and largely defines selectivity of receiver 600. Comparator 626 acts as a 1-bit A/D converter, providing a logic high signal on line 627 when the output signal from filter 624 exceeds a predetermined threshold and providing a logic low signal on line 627 otherwise.

The digital signal on line 627 enters a DSP subsystem 605 of receiver 600 and couples to a second mixer 630 implemented in subsystem 605. Mixer 430 frequency translates the filtered, 1-bit signal on line 627 to a baseband signal, which is integrated by a summing module 640.

The local oscillator signal (a 1-bit signal from an FPGA output line) controlling analog mixer 622 comes from a first local oscillator DDS module 650, which is unstabilized. The local oscillator signal controlling digital mixer 630 comes from a second local oscillator DDS module 660, which is phase-controlled by a stability compensating DDS module 662.

DDS modules 660 and 662 cooperatively form a phase-stabilizing signal generator. A phase-stabilizing signal generator according to various aspects of the invention includes any hardware, software, or combination of both producing an output with phase that varies in a useful, predictable manner with respect to a reference signal, e.g., a broadcasted signal. Such variation can be configured to be opposite the expected variation of an unstabilized signal generator. In receiver 600, the outputs of the phase-stabilizing generator formed by DDS modules 662 and 660 and unstabilized signal generator 650 are applied to successive mixers 622 and 630.

Stability compensating DDS module 662 causes mixer 630 to frequency translate the first IF signal at line 627 with an induced phase instability. This phase instability is opposite that of stabilized DDS module 650, and opposite the phase instability that mixer 622 consequently imparts to the received signal. Advantageously, the phase instabilities cancel each other out. The signal integrated by summing module 640 (e.g., for four seconds or about $100 \times 10^6$ samples clocked at 24 MHz) is substantially phase stable with respect to sync pulses on bus 340, and with respect to the broadcasted signal on line 330 that generates them.

The output of summing module 640, on line 610, varies with the phase of the received signal. Line 610 couples via bus 320 to control module 310, where device 300 can implement functions of a spatial position computer. When device 300 is employed as tracker 110 of system 100, for example, the spatial position computer it implements determines a spatial position of transmitter 114 and receiver 116 (which is typically but not necessarily the same as the position of tracker 110 itself) relative to transponder 150.

As mentioned above, the configuration discussed with reference to FIGS. 3–6 is merely exemplary. Again, a tracker, transponder, reference signal generator, transmitter, and receiver according to various aspects of the invention can include any suitable hardware, software, or combination of both for performing the respective functions of those devices.

Figure 7:
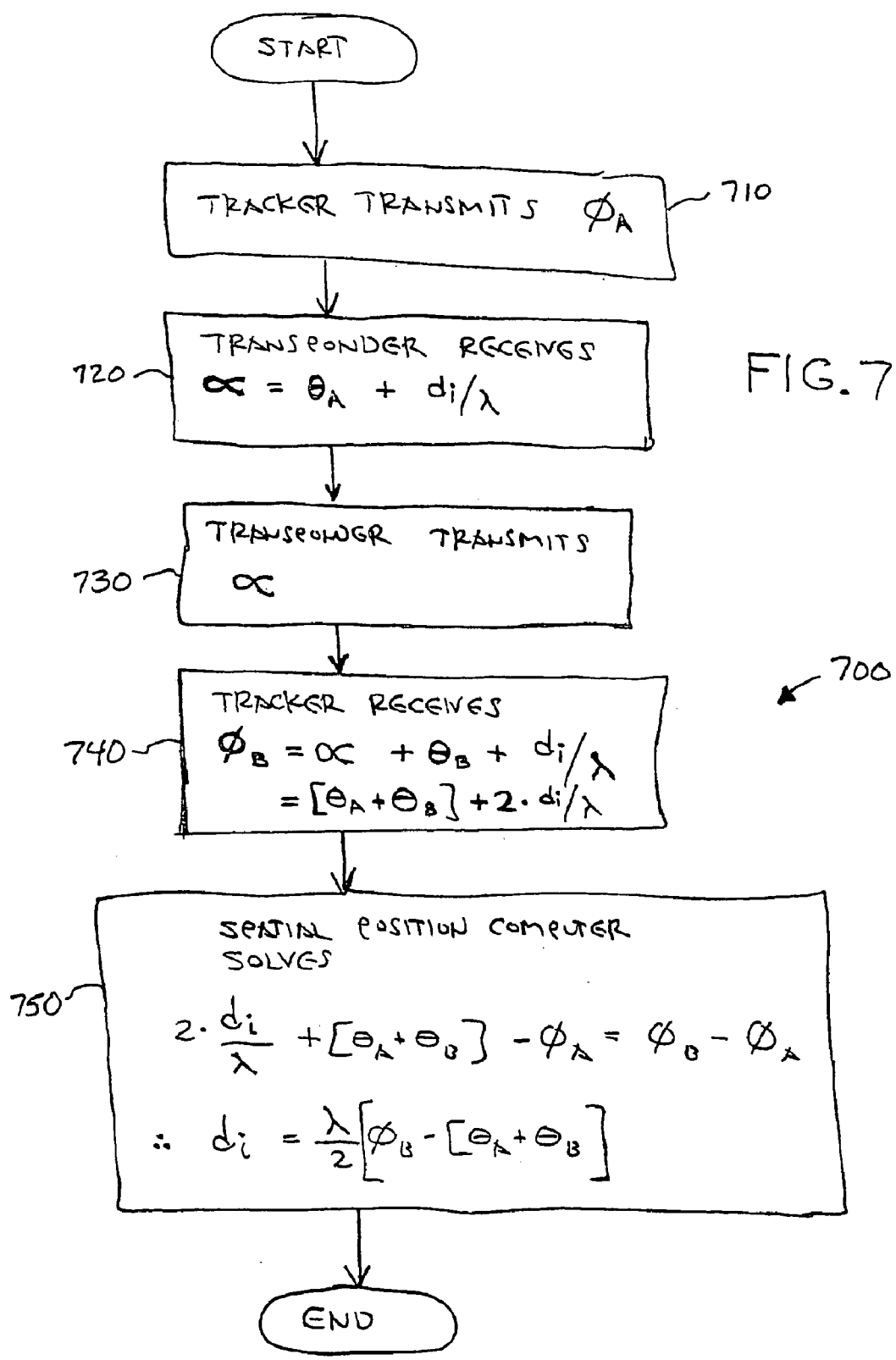
FIG. 7 is a functional flow diagram of a spatial position determination process according to various aspects of the invention.

Spatial position determination according to various aspects of the invention may be better understood with reference to an exemplary method 700 of FIG. 7. Method 700 begins at process 710, at which the tracker transmits a forward signal having phase $\phi_A$. This phase represents the unknown, non-referenced phase of a transmitted signal after passing through various stages of signal processing. Method 700 continues at process 720, at which a transponder receives the signal with a phase α. As shown in FIG. 7, phase a is directly proportional to the distance between tracker and transponder. Phase a also includes an unknown additive term $\theta_A$ that results from signal processing phase shifts in the transponder receiver.

At process 730, the transponder transmits a return signal at the received phase α. The return signal, as transmitted at the transponder, is thus also directly proportional to the distance between tracker and transponder. When received at the tracker, at process 740, the return signal phase $\phi_B$ is directly proportional to twice this distance. Phase $\phi_B$ also includes an unknown additive term $\phi_B$ that results from signal processing phase shifts in the tracker receiver.

Method 700 concludes at process 750, at which a spatial position computer (preferably in the tracker device itself)

determines distance (including some unknown additive term) based on stored indicia of wavelength(s), here a common wavelength λ, of the forward and return signals.

Figure 8:
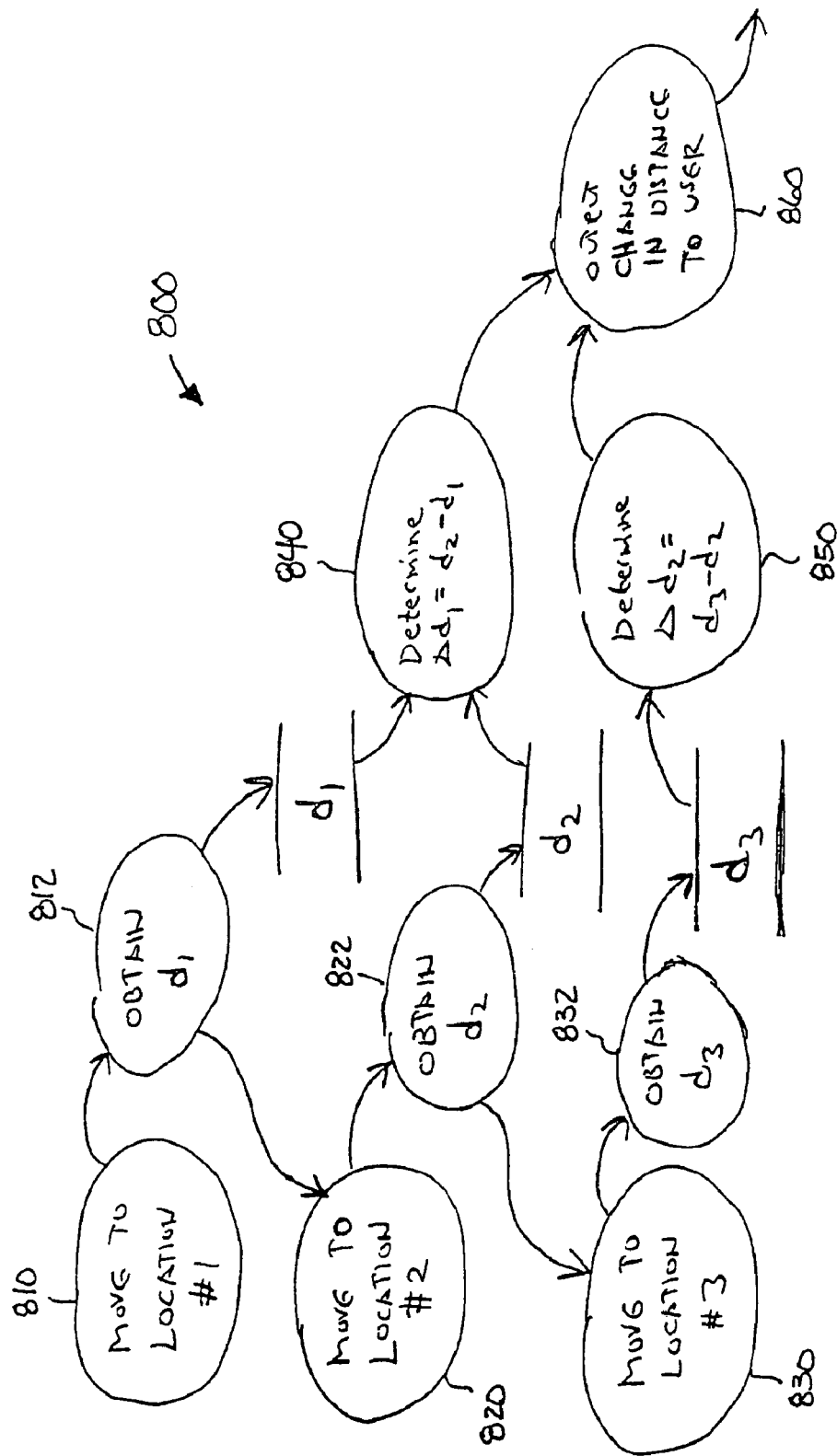
FIG. 8 is a data flow diagram of a method for determining changes in spatial position according to various aspects of the invention.

A method 800 for determining an offset from a previous spatial position (here, change in distance) may be better understood with reference to FIG. 8. In addition, a method 900 for determining spatial position expressed as an azimuthal angle may be better understood with reference to FIG. 9.

Method 800 involves movement to three locations, by processes 810, 820, and 830. At these locations, three distance measurements $d_1$, $d_2$ and $d_3$ are obtained, by processes 812, 822, and 832, respectively. The additive terms $\theta_A$ and $\theta_B$ prevent determination of an absolute spatial position (here, distance) based on a single measurement. Thus, the measured distance values $d_1$, $d_2$, and $d_3$ are proportional values that all include some unknown additive term.

Process 840 determines an offset $\Delta d_1$ from $d_2$ and the previous spatial position $d_1$. Similarly, process 850 determines an offset $\Delta d_2$ from $d_3$ and the then-previous spatial position $d_2$. These offsets (i.e., changes in distance) are output to a user by process 860. Though FIG. 8 depicts three distance measurements, this is only exemplary. As few as two can give meaningful results, and many more measurements are likely to be made during a typical search using a system according to various aspects of the invention.

Figure 9:
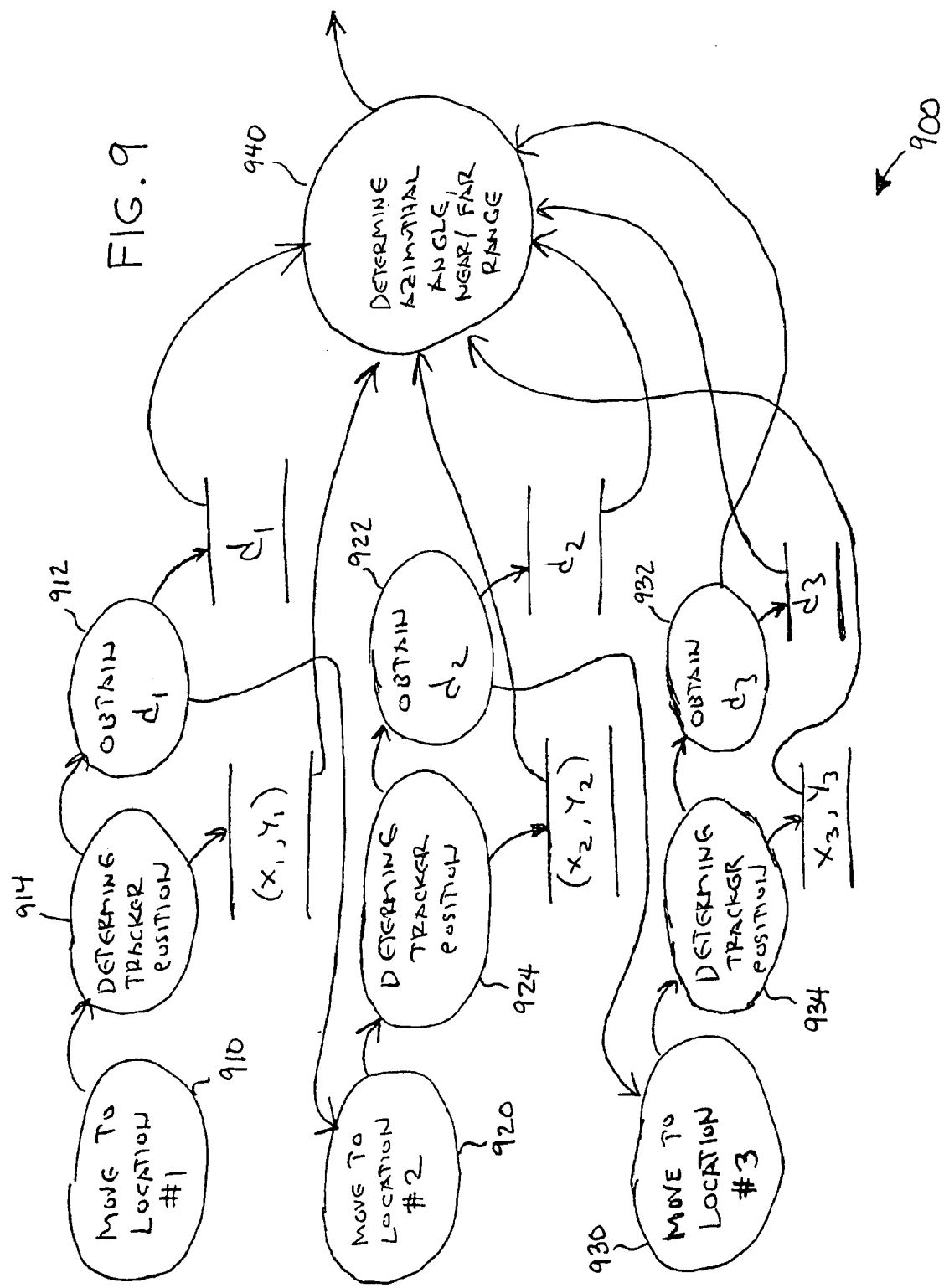
FIG. 9 is a data flow diagram of a method for determining spatial position expressed as an azimuthal angle according to various aspects of the invention.

Method 900 of FIG. 9 also involves movement to three locations, by processes 910, 920, and 930. Unlike method 800, method 900 includes processes 914, 924, and 934 for determining tracker position at these three locations, expressed as relative X and Y coordinates $(X_1,Y_1)$, $(X_2,Y_2)$, and $(X_3,Y_3)$. The locations can be determined based on instructions to a user. For example, a user may be instructed to "take a measurement, move three paces north, take a measurement, then move three paces east and take a measurement." In an advantageous variation, processes 914, 924, and 934 can employ a position determination device (e.g., optional GPS module 122 of tracker 110) to determine positional coordinates for multiple locations as the user moves about in search of a lost object.

Processes 912, 922, and 932 obtain three distance measurements $d_1$, $d_2$, and $d_3$ at the respective known locations. Preferably, these processes, and processes 812, 822, and 832 of method 800, each perform an instance of method 700 of FIG. 7. Based on the known coordinates $(X_1,Y_1)$, $(X_2,Y_2)$, and $(X_3,Y_3)$ and associated distance measurements $d_1$, $d_2$, and $d_3$, process 940 determines spatial position, which can be expressed and displayed as an azimuthal angle from tracker to transponder.

Process 940 can employ any suitable technique for such position determination. For example, the azimuthal angle can be computed from the equation $\phi=\tan^{-1}(\Delta d_1/\Delta d_2)$. Given enough measurements, process 940 may also compute a rough near/far approximation of absolute distance between tracker and target.

PUBLIC NOTICE REGARDING THE SCOPE OF THE INVENTION AND CLAIMS

The inventor considers various elements of the aspects and methods recited in the claims filed with the application as advantageous, perhaps even critical to certain implementations of his invention. However, the inventor regards no particular element as being "essential," except as set forth expressly in any particular claim. The following are various systems, devices, and methods contemplated by the inventor that omit various advantageous but non-essential elements discussed above.

A spatial position determination system, which omits transponder 150 of FIG. 2, includes a tracker reference signal generator that is coupled to and phase-stabilized by a broadcasted signal. The system further includes a tracker transmitter and tracker receiver that are both coupled to and phase-stabilized by the tracker reference signal generator. The system further includes a spatial position computer that is coupled to the tracker receiver and at least one of the tracker reference signal generator and the tracker transmitter. The spatial position computer is responsive to indicia of a phase relationship between an output signal from the tracker transmitter and an input signal to the tracker receiver. Thus, the spatial position computer can determine a spatial position of the tracker transmitter and tracker receiver relative to a source of the input signal to the receiver.

An active reflector contemplated by the inventor, which omits tracker 110 of FIG. 2, includes a receiver and a transmitter that is phase-controlled by the receiver. Such a device advantageously transmits a signal having a phase determined by the phase of the signal receives. Consequently, the device provides an "echo" of a signal for phase-based distance measurement without the need to overcome path loss for both the forward and return trip, as well as passive reflection loss and phase uncertainty induced by an irregular reflecting surface.

A phase-stabilized or phase-stabilizing signal generator, which can be advantageously employed in any device requiring an output phase-stabilized to an input, includes (1) a first DDS module having a phase accumulator that is clocked responsive to sync pulses, and (2) a second DDS module, coupled to the stabilizing frequency synthesizer and having a phase accumulator that is clocked by system clock pulses but forced to the accumulated phase of the first DDS module upon occurrence of a qualified sync pulse.

A phase-stabilized signal generator produces an output of substantially the same phase stability as the source of sync pulses and qualified sync pulses. A phase-stabilizing signal generator produces an output with phase that varies in a useful, predictable manner with respect to the source of pulses. As discussed above, such variation can be configured to be opposite the expected variation of an unstabilized signal generator. When the outputs of the phase-stabilizing and unstabilized signal generators are applied to successive mixers in a signal processing chain, the opposite variations cancel each other out. A signal that is frequency translated by the signal processing chain can thus avoid phase instability from the unstabilized signal generator.

While the invention is described herein in terms of preferred embodiments and generally associated methods, the inventor contemplates that alterations and permutations of the preferred embodiments and methods will become apparent to those skilled in the art upon a reading of the specification and a study of the drawings. Below is a listing of some examples of variations contemplated by the inventor and falling within the scope of the claims unless excluded by specific claim language.

EXAMPLE A

Instead of transmitting an unmodulated carrier as described above, tracker 110 can transmit a carrier phase modulated by a pseudo-random sequence. The chip time (i.e., duration of each phase modulation symbol) can be determined by the time base shared by the tracker and the target. The chip rate can be a predetermined fraction of the carrier frequency, or a predetermined fraction of the broadcasted signal's frequency.

Transponder 150 performs a correlation maximization search to determine the start time of the pseudo-random sequence. This correlation needs to be performed only during the initial synchronization acquisition process. All subsequent transmissions can remain synchronized due to the common time base.

In this variation, system 100 relies on the ability of both tracker 110 and transponder 150 to measure the phase of the signals they each receive. The DSSS phase modulation does not interfere with this measurement. In each DSSS receiver the incoming signal is multiplied by the pseudo-random phase sequence to yield a constant phase received signal.

The phase-modulated DSSS signal has a spectral bandwidth proportional to the chip rate. An equalization filter can be applied to reduce the effect of variable group delay across the band. This filter does not necessarily interfere with the phase measurement of the incoming signal. For example, without loss of generality, the equalization filter can be chosen to have zero phase at the carrier frequency.

EXAMPLE B

In some implementations, it may be desirable to phase stabilize to an FM broadcast station. However, FM signals do not have constant phase. Variations of tracker 110 and transponder 150 may overcome this issue by both computing an averaged reference signal in the same way. For example, each unit may compute the instantaneous broadcast frequency to be 107 divided by the time elapsed during the previous 107 cycles. Continuous computation would require a circular buffer.

EXAMPLE C

Phase stabilization can be to subcarriers of a broadcasted signal rather than carrier of the signal. For example, variations of reference signal generators 112 and 152 can phase stabilize other components to the color-burst frequency from TV stations, or to commercial subcarriers from FM broadcast stations.

EXAMPLE D

Frequency synthesis can be performed in the optical domain. Nonlinear optical media can be used to generate a transmitted signal or signals from a broadcasted coherent light signal. For example, if light generated by a single laser is dispersed over an area including a tracker and transponder, nonlinear optical media in each unit can be employed to generate the same phase-coherent type of light, of a wavelength different from that of the dispersed laser light.

EXAMPLE E

In typical implementations, the broadcasted signal is received by both a tracker and transponder from an external transmitter. With a suitably stable self-contained oscillator in either unit, however, such a signal can be broadcasted from that unit, received by the other, and employed by both for phase stabilization.

EXAMPLE F

Systems not requiring the benefits of digital phase stabilization can employ one or more conventional phase-locked loops (e.g., with a VCXO) for phase stabilization.

EXAMPLE G

An advantageous use of system 100 is the location of buried avalanche victims and missing skiers, hikers, firefighters, etc. Many ski resorts have poor broadcasted signal reception due to remoteness and surrounding mountains. To overcome this issue, a variation of broadcast transmitter 105 can be a local broadcast beacon having transmission coverage over an area that includes potential avalanche sites.

EXAMPLE H

In a variation, the transponder can transform the received forward signal with a nonlinear transfer function. The frequency scaled signal in such a variation is a harmonic of the received forward signal. As defined herein and in Barry Truax, ed., Handbook For Acoustic Ecology (1999), a harmonic is an integer multiple of a fundamental and a subharmonic is an integer submultiple or fraction of a fundamental.

EXAMPLE I

In another variation, the transponder can digitally frequency divide the received forward signal, whereby the frequency scaled signal is a subharmonic of the received forward signal.

EXAMPLE J

In another variation, the transponder can digitally synthesize the frequency scaled signal responsive to the received forward signal, whereby the frequency scaled signal is a subharmonic of the received forward signal.

EXAMPLE K

A loop antenna could be substituted for the whip antenna 112 of FIG. 1.

EXAMPLE L

The antenna for transponder 150 can be a ferrite loopstick, or any suitable alternative. One such alternative is including a conductive loop in the collar of dog 155 that carries transponder 150. Preferably, the loop is resonated with suitable capacitive tuning of the loop, with optional resistive Q dampening and an at least partially horizontal loop orientation (as illustrated in FIG. 1) to avoid directional nulls.

EXAMPLE M

Phase-stabilizing tracker 110 and transponder 150 to a single AM broadcast station (one of many options) requires both devices to choose the same station. In a variation, each unit can phase stabilize to numerous receivable AM stations in an aggregate, weighting each station's influence by the receive strength for that station to yield a reference signal whose phase varies slowly with the geographical position of the unit.

Accordingly, neither the above description of preferred exemplary embodiments, nor the code listing of a merely illustrative simulated embodiment below, nor the abstract defines or constrains the invention. Rather, the issued claims variously define the invention. Each variation of the invention is limited only by the recited limitations of its respective claim, and equivalents thereof, without limitation by other terms not present in the claim. For example, claims that do not recite any specific components of a spatial position computer read on methods that include, and exclude, advantageous components recited in other claims, such as memory cells including indicia of a plurality of previous spatial positions. As another example, claims not reciting limitations regarding components of a transponder read on devices and methods that include, and exclude, advantageous components such as a transponder reference signal generator.

In addition, aspects of the invention are particularly pointed out in the claims using terminology that the inventor regards as having its broadest reasonable interpretation; the more specific interpretations of 35 U.S.C. § 112(6) are only intended in those instances where the terms "means" or "steps" are actually recited. The words "comprising," "including," and "having" are intended as open-ended terminology, with the same meaning as if the phrase "at least" were appended after each instance thereof.

| COMPUTER PROGRAM LISTING |
| --- |

```
1   %%% SPATIAL POSITION DETERMINATION SYSTEM
2   %%% Timing Analysis
3   %%% Runs on Octave, a GPL alternative to MATLAB
4   %
5   N = 4096;      % No. of pts.
6   i = 1:N;       % pts. in vectors
7   C = 3;         % Scaling of displayed sync pulses
8   qt = 0.15;     % Threshold for qualified sync pulses
9   % Frequency error (fraction of clock freq. at each end)
10  fe = 0.25;
11  %
12  %%% Define frequencies
13  fclk = 24E6;
14  ftx = 3.5E6;
15  fbs = 5E6;
16  %
17  %%% Define max time and time vector
18  T = 200*(1/fclk);
19  t = (i/N)*T;
20  %
21  %%% Define base signal vectors
22  %%% Assign plot offset to each displayed signal
23  %
24  % Frequency error in clock (should be visible)
25  ferr = linspace(0,1,N);
26  ferr = fe/2*fclk*( ferr. 2 ) + fe/2*fclk*ferr;
27  %
28  % System Clock
29  prand = rand; % Random phase component
30  f = fclk*ones(1,N) + ferr;
31  sclk = exp( j*2*pi*( f .* t + prand) );
32  clk_scale = 2.5;
33  sclk = clk_scale*sign(real(sclk)) .* ...
34      min( 1/clk_scale*ones(1,N) , abs(real(sclk)) );
35  oclk = 15;
36  %
37  % Broadcasted signal
38  sbs = exp(j*2*pi*fbs*t);
39  obs = 12;
40  %
41  % sync pulses
42  kk = 1;
43  SBS = [1 0];
44  for k = 2:N
45      if ( sign(real(sclk(k))) ~= sign(real(sclk(k-1))) )
46          SBS(kk,2) = sbs(k);
47          SBS(kk,1) = k;
48          kk = kk+1;
49      end % endif
50  end % endfor
51  %
52  sync = zeros(1,N); qsync = zeros(1,N);
53  SYNC = [ ]; QSYNC = [ ];
54  for k = 2:max(size(SBS))
55      if ( sign(real(SBS(k,2))) ~= sign(real(SBS(k-1,2))) )
56          sync( SBS(k,1) ) = 1;
57          SYNC = [ SYNC SBS(k,1) ];
58          if ( abs(real(SBS(k,2))) < qt )
59              qsync( SBS(k,1) ) = 1;
60              QSYNC = [ QSYNC SBS(k,1) ];
```

| -continued |
| --- |
| COMPUTER PROGRAM LISTING |

```
61          end % endif
62  %
63      end % endif
64  end % endfor
65  sync = sync(1:N); % Trim if necc.
66  osync = 9;
67  oqsync = 7;
68  %
69  % Synthesize phase-stabilizing signal
70  pinit = 0;
71  %
72  % SIMULATION
73  kk = 1;
74  while (kk > 0)
75  %
76  % Stabilizing Synthesizer
77  pstab = [ ];
78  pa1 = ftx / fbs;    % Phase increment
79  p1 = pinit;         % Initial phase
80  for k = 1:max(size(SYNC))-1
81      p1 = rem(p1+pa1,1);
82      pstab( SYNC(k) :SYNC(k+1)-1 ) = p1;
83  end % endfor
84  pstab( SYNC(k+1) :N ) = rem(p1+pa1,1);
85  sstab = exp(j*2*pi*pstab);    % Convert phase to sinusoid
86  ostab = 5;
87  %
88  % TX Synthesizer (unstabilized)
89  ptxu = [ ];
90  pa2 = ftx /         % Phase increment
         fclk;
91  p2 = 0;             % Initial phase
92  for k = 2:max(size(SBS))
93      p2 = rem(p2+pa2,1);
94      ptxu( SBS(k-1,1):SBS(k,1) ) = p2;
95  end % endfor
96  ptxu( SBS(k,1) :N ) = rem(p2+pa2,1);
97  stxu = exp(j*2*pi*ptxu); % Convert phase to sinusoid
98  otxu = 2;
99  %
100 % TX Synthesizer (stabilized)
101 ptx = [ ];
102 pa3 = ftx /         % Phase increment
         fclk;
103 p3 = 0;             % Initial phase
104 for k = 2:N
105     % 1 if match, 0 if none
106     match = length( find( QSYNC==k ) );
107     if ( match )
108         p3 = pstab (k);        % Force to "correct" phase
109     elseif ( sign(real(sclk(k))) ~= sign(real(sclk(k-1))) )
110         % Not a qual. sync pulse, so don't force
111         p3 = rem(p3+pa3,1);
112     end % endif
113     ptx(k) = p3;
114 end % endfor
115 stx = exp(j*2*pi*ptx);     % Convert phase to sinusoid
116 otx = -1;
117 %
118 kk = input('Enter frame # 1,2,3, or 4 (0 to quit): ');
119 %
120 k1 = max(1,(N/4)*(kk-1)+1); k2 = min((N/4)*kk,N);
121 %
122 pst = "r";
123 subplot(1,1,1); plot([0 1]); pause;
124 plot( . . .
125 i(k1:k2),real(sbs(k1:k2))+obs,pst, . . .
126 i(k1:k2),real(sclk(k1:k2))+oclk,pst, . . .
127 i(k1:k2),sync(k1:k2)+osync,pst, . . .
128 i(k1:k2),qsync(k1:k2)+oqsync,pst, . . .
129 i(k1:k2),sstab(k1:k2)+ostab,pst, . . .
130 i(k1:k2),stxu(k1:k2)+otxu,pst, . . .
131 i(k1:k2),stx(k1:k2)+otx,pst);
132 %
133 end % endwhile
134 %
135 %%% Display filtered signals
```

-continued

COMPUTER PROGRAM LISTING

```
136 %
137 fc = 2*ftx;       % Set fc to "correct" frequency of ftx
138 Nc = ceil( fc*T ); % No. of Fourier steps in passband
139 %
140 % Build passband vector
141 F = zeros(1,N);
142 F(Nc-2:Nc+2) = [1 1 1 1 1];
143 % Filter coeffs.
144 b = real (ifft (F));
145 Nb = 512;
146 b = Nb*hamming(Nb+1)'.*fftshift([b(2:Nb/2) b(1) b(N-Nb/2:N)]);
147 %
148 subplot(1,1,1); plot([0 1]); pause;
149 %
150 stxu_f = filter(b,1,stxu);
151 stx_f = filter(b,1,stx);
152 Nf = length(stxu_f);
153 %
154 subplot(2,1,1); plot(1:Nf,real(stxu_f),pst);
155 subplot(2,1,2); plot(1:Nf,real(stx_f),pst);
```

What is claimed is:

1. A spatial position determination system comprising:
   (a) a tracker unit comprising:
      (1) a reference signal generator responsive to and phase-stabilized by a broadcast signal;
      (2) a transmitter coupled to and phase-stabilized by the reference signal generator; and
      (3) a receiver coupled to and phase-stabilized by the reference signal generator;
   (b) a transponder unit coupled via field radiation to the tracker unit, wherein the transponder unit is triggered by the transmitter to produce a return signal and the receiver is responsive to the return signal; and
   (c) a spatial position computer coupled to the receiver and at least one of the reference signal generator and the transmitter, responsive to indicia of a phase relationship between an output signal from the transmitter and the return signal;
whereby the spatial position computer determines a spatial position of the tracker unit relative to the transponder.

2. The system of claim 1 wherein the reference signal generator is responsive to a commercial broadcast signal.

3. The system of claim 2 wherein the reference signal generator is responsive to a commercial broadcast signal in a frequency range between about 500 kHz and about 1600 kHz.

4. The system of claim 1 wherein, during operation:
   (a) the spatial position computer includes a memory cell that includes indicia of a previous spatial position; and
   (b) responsive to the indicia, the spatial position computer determines the spatial position of the tracker unit relative to a source of the return signal, the spatial position being expressed as an offset from the previous spatial position.

5. The system of claim 1 wherein, during operation:
   (a) the spatial position computer includes a memory cell that includes indicia of wavelength of at least the return signal; and
   (b) responsive to the indicia, the spatial position computer determines the spatial position of the tracker unit relative to a source of the return signal, the spatial position being expressed as a physical measure of distance.

6. The system of claim 1 wherein, during operation:
   (a) the spatial position computer includes memory cells that include indicia of a plurality of previous spatial positions; and
   (b) responsive to the indicia, the spatial position computer determines the spatial position of the tracker unit relative to a source of the return signal, the spatial position being expressed as an azimuthal angle from the tracker unit.

7. The system of claim 1 further comprising a controller coupled to the transmitter and configured to periodically enable and disable signal transmission therefrom.

8. The system of claim 1 wherein the transponder comprises:
   (a) a transponder reference signal generator responsive to and phase-stabilized by a broadcast signal;
   (b) a transponder receiver coupled to and phase-stabilized by the transponder reference signal generator and coupled via field radiation to the transmitter; and
   (c) a transponder transmitter coupled to and phase-stabilized by (1) the transponder reference signal generator and (2) the transponder receiver.

9. The system of claim 8 wherein the transponder reference signal generator is responsive to a commercial broadcast signal in a frequency range between about 500 kHz and about 1600 kHz.

10. The system of claim 8 wherein the reference signal generator of the tracker unit and the transponder reference signal generator are both responsive to the same broadcast signal.

11. The system of claim 1 wherein the transponder comprises:
   (a) a transponder receiver coupled via field radiation to the transmitter and including a frequency scaler responsive to the output signal from the tracker transmitter; and
   (b) a transponder transmitter coupled to the transponder receiver and phase-stabilized responsive to a frequency-multiplied signal from the frequency scaler.

12. The system of claim 11 wherein the frequency scaler includes a signal stage having a nonlinear transfer function, whereby the frequency scaled signal is a harmonic of the output signal from the tracker transmitter.

13. The system of claim 11 wherein the frequency scaler includes a digital frequency divider, whereby the frequency scaled signal is a sub-harmonic of the output signal from the tracker transmitter.

14. The system of claim 11 wherein the frequency scaler includes a direct digital synthesizer, whereby the frequency scaled signal is a rational multiple of the output signal from the tracker transmitter.

15. The system of claim 1 further comprising a digital signal processing subsystem that, during operation, implements at least portions of the reference signal generator, transmitter, and receiver of the tracker unit.

16. The system of claim 1 further comprising a control subsystem that, during operation, implements at least portions of the spatial position computer.

17. A method for processing phase information, comprising:
   (a) receiving a broadcast signal at a first location;
   (b) at the first location, transmitting a forward signal that is phase-stabilized to the broadcast signal;
   (c) at a second location, transmitting a return signal responsive to the forward signal, the return signal having phase stability substantially corresponding to phase stability of the forward signal;

(d) at the first location, receiving the return signal and deriving an output signal with phase stability substantially corresponding to phase stability of the return signal; and (e) using the broadcast signal and the receiver output signal to determine a phase relationship between the forward and return signals.

18. The method of claim 17 wherein receiving the broadcast signal comprises receiving the signal from a commercial broadcast transmitter.

19. The method of claim 18 wherein receiving the broadcast signal comprises receiving the signal in a frequency range between about 500 kHz and about 1600 kHz.

20. The method of claim 17 further comprising determining a spatial position of the first location relative to the second location from the phase relationship between the forward and return signals.

21. The method of claim 20 further comprising:

(a) storing indicia of a previous spatial position; and (b) using the stored indicia to determine the spatial position expressed as an offset from the previous spatial position.

22. The method of claim 20 further comprising:

(a) storing indicia of wavelength of at least one of the forward and return signals; and (b) using the stored indicia to determine the spatial position expressed as a physical measure of distance.

23. The method of claim 20 further comprising:

(a) storing indicia of a plurality of previous spatial positions; and (b) using the stored indicia to determine the spatial position expressed as an azimuthal angle from the tracker.

24. The method of claim 20 further comprising periodically enabling and disabling transmission of the forward and return signals.

25. The method of claim 17 further comprising, at the second location:

(a) receiving the broadcast signal; and (b) phase-stabilizing the return signal to the forward signal and the broadcast signal, wherein any additional phase instability of the return signal over that of the forward signal substantially corresponds to phase instability of the broadcast signal.

26. The method of claim 25 wherein receiving the broadcast signal at the second location comprises receiving the signal in a frequency range between about 500 kHz and about 1600 kHz.

27. The method of claim 26 wherein:

(a) receiving the broadcast signal at the first location comprises receiving the signal in a frequency range between about 500 kHz and about 1600 kHz; and (b) the same broadcast signal is received at the first and second locations.

28. The method of claim 17 wherein transmitting a return signal responsive to the forward signal comprises, at the second location:

(a) receiving the forward signal;

(b) frequency scaling the received forward signal; and (c) amplifying and filtering the frequency scaled signal and transmitting the result as the return signal.

29. The system of claim 28 wherein frequency scaling comprises transforming the received forward signal with a nonlinear transfer function, wherein the frequency scaled signal is a harmonic of the received forward signal.

30. The system of claim 28 wherein frequency scaling comprises digitally frequency dividing the received forward signal, wherein the frequency scaled signal is a subharmonic of the received forward signal.

31. The system of claim 28 wherein frequency scaling comprises digitally synthesizing the frequency scaled signal responsive to the received forward signal, wherein the frequency scaled signal is a rational multiple of the output signal from the tracker transmitter.

32. A system for processing phase information, comprising:

(a) means for receiving a broadcast signal;

(b) means for transmitting a forward signal that is phase-stabilized to the broadcast signal;

(c) means for receiving a return signal to derive a receiver output signal therefrom, receiving being phase-stabilized to the broadcast signal such that the receiver output signal has phase stability substantially corresponding to phase stability of the return signal; and (d) means for determining a phase relationship between the forward and return signals responsive to the broadcast signal and the receiver output signal.

* * * * *